US007303119B2

(12) United States Patent
Molbak

(10) Patent No.: US 7,303,119 B2
(45) **Date of Patent: *Dec. 4, 2007**

(54) COIN COUNTER AND VOUCHER DISPENSING MACHINE AND METHOD

(75) Inventor: Jens H. Molbak, Bellevue, WA (US)

(73) Assignee: Coinstar, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/526,196

(22) Filed: Sep. 21, 2006

(65) Prior Publication Data

US 2007/0069007 A1 Mar. 29, 2007

Related U.S. Application Data

(60) Continuation of application No. 11/225,874, filed on Sep. 13, 2005, now Pat. No. 7,131,580, which is a continuation of application No. 10/733,522, filed on Dec. 10, 2003, now Pat. No. 6,976,570, which is a continuation of application No. 10/434,384, filed on May 7, 2003, now Pat. No. 6,758,316, which is a division of application No. 10/119,534, filed on Apr. 9, 2002, now Pat. No. 6,854,581, which is a continuation of application No. 09/035,273, filed on Mar. 9, 1998, now abandoned, which is a continuation of application No. 08/834,952, filed on Apr. 7, 1997, now Pat. No. 5,799,767, which is a continuation of application No. 08/237,486, filed on May 3, 1994, now Pat. No. 5,620,079, which is a continuation of application No. 07/940,931, filed on Sep. 4, 1992, now abandoned.

(51) Int. Cl.

| | |
|---|---|
| ***G06Q 40/00*** | (2006.01) |
| ***G07D 11/00*** | (2006.01) |
| ***G07F 19/00*** | (2006.01) |

(52) U.S. Cl. ....................................... 235/379; 235/381

(58) Field of Classification Search ................ 235/379, 235/381, 7 R, 425; 453/29–30
See application file for complete search history.

(56) References Cited

U.S. PATENT DOCUMENTS

| | | | |
|---|---|---|---|
| 446,303 | A | 2/1891 | Thompson |
| 1,010,993 | A | 12/1911 | White |
| 1,234,707 | A | 7/1917 | Whistler |
| 1,711,049 | A | 4/1929 | Fonda et al. |

(Continued)

FOREIGN PATENT DOCUMENTS

| | | |
|---|---|---|
| CA | 1053598 | 2/1979 |

(Continued)

OTHER PUBLICATIONS

Svenska Penninglotteriet Documents, 1988, 68 pages.

(Continued)

*Primary Examiner*—Uyen-Chau N Le
(74) *Attorney, Agent, or Firm*—Perkins Coie LLP

(57) ABSTRACT

Methods and systems for exchanging coins are disclosed herein. In one embodiment, a method of exchanging coins includes positioning a coin counting kiosk in a publicly-accessible area of a supermarket, and receiving a plurality of coins of multiple denominations at the coin counting kiosk. The method of this embodiment further includes counting the plurality of coins to determine a total value of the coins, and dispensing a voucher from the coin counting kiosk. The voucher can be redeemed at a point of sale in the supermarket for an amount related to the total value of the coins. The method of this embodiment additionally includes communicating status information from the coin counting kiosk to a central computer located outside of the supermarket.

62 Claims, 18 Drawing Sheets

U.S. PATENT DOCUMENTS 1,813,296 A 7/1931 Kidwell
1,847,940 A 3/1932 Giles
1,945,948 A 2/1934 Morin
2,014,505 A 9/1935 Patche
2,317,351 A 4/1943 Andalikiewicz et al.
2,461,314 A 2/1949 Davis et al.
2,569,360 A 9/1951 Weingart
2,644,470 A 7/1953 Labbe
2,865,561 A 12/1958 Rosapepe
2,881,774 A 4/1959 Labbe
2,960,377 A 1/1960 Simjian
3,009,555 A 11/1961 Seckula, Sr.
3,048,251 A 8/1962 Bower
3,056,132 A 9/1962 Simjian
3,065,467 A 11/1962 Prevost
3,132,654 A 5/1964 Adams
3,173,742 A 3/1965 Simjian
3,196,257 A 7/1965 Buchholtz et al.
3,396,737 A 8/1968 Picollo
3,415,348 A 12/1968 Wahlberg
3,599,771 A 8/1971 Hinterstocker
3,603,327 A 9/1971 Buchholz et al.
3,763,871 A 10/1973 Jobst
3,788,440 A 1/1974 Propice et al.
3,815,717 A 6/1974 Arseneau
3,941,226 A 3/1976 Drakes
3,960,293 A 6/1976 Sweet, II et al.
3,969,584 A 7/1976 Miller et al.
3,998,237 A 12/1976 Kressin et al.
4,014,424 A 3/1977 Hall
4,036,242 A 7/1977 Breitenstein et al.
4,058,954 A 11/1977 Asami
4,059,122 A 11/1977 Kinoshita
4,092,990 A 6/1978 Bayne
4,099,722 A 7/1978 Rodesch et al.
4,100,925 A 7/1978 Fukunaga
4,106,610 A 8/1978 Heiman
4,124,109 A 11/1978 Bissell et al.
4,141,372 A 2/1979 Gdanski
4,167,949 A 9/1979 Hashimoto et al.
4,172,462 A 10/1979 Uchida et al.
4,225,056 A 9/1980 Flubacker
4,228,811 A 10/1980 Tanaka et al.
4,230,213 A 10/1980 Spring
4,249,552 A 2/1981 Margolin et al.
4,266,121 A 5/1981 Hirose
4,275,751 A 6/1981 Bergman
4,306,644 A 12/1981 Rockola et al.
4,321,672 A 3/1982 Braun et al.
4,326,620 A 4/1982 Felix et al.
4,346,798 A 8/1982 Agey, III
4,356,829 A 11/1982 Furuya
4,360,034 A 11/1982 Davila et al.
4,369,442 A 1/1983 Werth et al.
4,369,800 A 1/1983 Watanabe et al.
4,374,557 A 2/1983 Sugimoto et al.
4,376,442 A 3/1983 Gomez et al.
4,380,316 A 4/1983 Glinka et al.
4,383,540 A 5/1983 De Meyer et al.
4,398,550 A 8/1983 Shireman
4,412,292 A 10/1983 Sedam et al.
4,412,607 A 11/1983 Collins et al.
4,434,359 A 2/1984 Watanabe
4,436,103 A 3/1984 Dick
4,442,850 A 4/1984 Austin et al.
4,447,714 A 5/1984 Lundblad et al.
4,503,963 A 3/1985 Steiner
4,504,357 A 3/1985 Holbein et al.
4,506,685 A 3/1985 Childers et al.
4,509,122 A 4/1985 Agnew et al.
4,509,633 A 4/1985 Chow
4,542,817 A 9/1985 Paulson
4,543,969 A 10/1985 Rasmussen
4,554,446 A 11/1985 Murphy et al.
4,558,711 A 12/1985 Ikuta Yoshiaki et al.
4,577,744 A 3/1986 Doucet
4,587,984 A 5/1986 Levasseur et al.
4,597,487 A 7/1986 Crosby et al.
4,598,378 A 7/1986 Giacomo
4,611,205 A 9/1986 Eglise
4,616,323 A 10/1986 Hayashi
4,616,776 A 10/1986 Blumenthal et al.
4,620,559 A 11/1986 Childers et al.
4,622,456 A 11/1986 Naruto et al.
4,677,565 A 6/1987 Ogaki et al.
4,694,845 A 9/1987 Zay
4,706,577 A 11/1987 Jones
4,706,795 A 11/1987 Mikami et al.
4,716,799 A 1/1988 Hartmann
4,723,212 A 2/1988 Mindrum et al.
4,733,765 A 3/1988 Watanabe
4,753,625 A 6/1988 Okada
4,775,353 A 10/1988 Childers et al.
4,775,354 A 10/1988 Rasmussen et al.
4,809,837 A 3/1989 Hayashi
4,814,589 A 3/1989 Storch et al.
4,831,374 A 5/1989 Masel
4,833,308 A 5/1989 Humble
4,883,158 A 11/1989 Kobayashi et al.
4,884,672 A 12/1989 Parker
4,896,791 A 1/1990 Smith
4,898,564 A 2/1990 Gunn et al.
4,910,672 A 3/1990 Off et al.
4,915,205 A 4/1990 Reid et al.
4,921,463 A 5/1990 Primdahl et al.
4,936,436 A 6/1990 Keltner
4,953,086 A 8/1990 Fukatsu
4,959,624 A 9/1990 Higgins, Jr. et al.
4,963,118 A 10/1990 Gunn et al.
4,964,495 A 10/1990 Rasmussen
4,969,549 A 11/1990 Eglise
4,978,322 A 12/1990 Paulsen
4,995,848 A 2/1991 Goh
4,997,406 A 3/1991 Horiguchi et al.
5,010,238 A 4/1991 Kadono et al.
5,021,967 A 6/1991 Smith
5,022,889 A 6/1991 Ristvedt et al.
5,025,139 A 6/1991 Halliburton, Jr.
5,027,937 A 7/1991 Parish et al.
5,039,848 A 8/1991 Stoken
5,040,657 A 8/1991 Gunn et al.
5,055,657 A 10/1991 Miller et al.
5,056,644 A 10/1991 Parker
5,073,767 A 12/1991 Holmes et al.
5,083,765 A 1/1992 Kringel
5,083,814 A 1/1992 Guinta et al.
5,088,587 A 2/1992 Goodrich et al.
5,091,713 A 2/1992 Horne et al.
5,098,339 A 3/1992 Dabrowski
5,098,340 A 3/1992 Abe
5,100,367 A 3/1992 Abe
5,111,927 A 5/1992 Schulze, Jr.
5,114,381 A 5/1992 Ueda et al.
5,135,433 A 8/1992 Watanabe et al.
5,173,851 A 12/1992 Off et al.
5,174,608 A 12/1992 Benardelli
5,183,142 A 2/1993 Latchinian et al.
5,195,626 A 3/1993 Le Hong et al.
5,201,396 A 4/1993 Chalabian et al.
5,219,059 A 6/1993 Furuya et al.
5,226,519 A 7/1993 DeWoolfson
5,236,339 A 8/1993 Nishiumi et al.
5,251,738 A 10/1993 Dabrowski
5,252,811 A 10/1993 Henochowicz et al.

| | | | |
|---|---|---|---|
| 5,293,981 | A | 3/1994 | Abe et al. |
| 5,299,673 | A | 4/1994 | Wu |
| 5,302,811 | A | 4/1994 | Fukatsu |
| 5,316,120 | A | 5/1994 | Ibarrola |
| 5,316,517 | A | 5/1994 | Chiba et al. |
| 5,321,242 | A | 6/1994 | Heath, Jr. |
| 5,330,041 | A | 7/1994 | Dobbins et al. |
| 5,350,906 | A | 9/1994 | Brody et al. |
| 5,355,988 | A | 10/1994 | Shirasawa |
| 5,365,046 | A | 11/1994 | Haymann |
| 5,374,814 | A | 12/1994 | Kako et al. |
| 5,388,680 | A | 2/1995 | Hird et al. |
| 5,409,092 | A | 4/1995 | Itako et al. |
| 5,429,222 | A | 7/1995 | Delay |
| 5,435,777 | A | 7/1995 | Takatani et al. |
| 5,441,139 | A | 8/1995 | Abe et al. |
| 5,449,058 | A | 9/1995 | Kotler et al. |
| 5,457,305 | A | 10/1995 | Akel et al. |
| 5,469,951 | A | 11/1995 | Takemoto et al. |
| 5,483,363 | A | 1/1996 | Holmes et al. |
| 5,506,393 | A | 4/1996 | Ziarno |
| 5,513,738 | A | 5/1996 | Hird et al. |
| 5,554,070 | A | 9/1996 | Takatoshi et al. |
| 5,555,497 | A | 9/1996 | Helbling |
| 5,560,467 | A | 10/1996 | Takemoto et al. |
| 5,564,546 | A | 10/1996 | Molbak et al. |
| 5,577,959 | A | 11/1996 | Takemoto et al. |
| 5,620,079 | A | 4/1997 | Molbak |
| 5,637,845 | A | 6/1997 | Kolls |
| 5,652,421 | A | 7/1997 | Veeneman et al. |
| 5,665,952 | A | 9/1997 | Ziarno |
| 5,679,070 | A | 10/1997 | Ishida et al. |
| 5,696,908 | A | 12/1997 | Muehlberger et al. |
| 5,699,328 | A | 12/1997 | Ishizaki et al. |
| 5,732,398 | A | 3/1998 | Tagawa |
| 5,743,429 | A | 4/1998 | Morofsky |
| 5,746,299 | A | 5/1998 | Molbak et al. |
| 5,799,767 | A | 9/1998 | Molbak |
| 5,839,956 | A | 11/1998 | Takemoto |
| 5,842,916 | A | 12/1998 | Gerrity et al. |
| 5,868,236 | A | 2/1999 | Rademacher |
| 5,880,444 | A | 3/1999 | Shibata et al. |
| 5,909,792 | A | 6/1999 | Gerlier et al. |
| 5,909,794 | A | 6/1999 | Molbak et al. |
| 5,974,146 | A | 10/1999 | Randle et al. |
| 5,991,413 | A | 11/1999 | Arditti et al. |
| 6,021,883 | A | 2/2000 | Casanova et al. |
| 6,047,807 | A | 4/2000 | Molbak |
| 6,105,009 | A | 8/2000 | Cuervo |
| 6,110,044 | A | 8/2000 | Stern |
| 6,116,402 | A | 9/2000 | Beach et al. |
| 6,119,099 | A | 9/2000 | Walker et al. |
| 6,138,106 | A | 10/2000 | Walker et al. |
| 6,144,946 | A | 11/2000 | Iwamura |
| 6,185,545 | B1 | 2/2001 | Resnick et al. |
| 6,227,343 | B1 | 5/2001 | Neathway et al. |
| 6,230,928 | B1 | 5/2001 | Hanna et al. |
| 6,233,564 | B1 | 5/2001 | Schulze, Jr. |
| 6,289,324 | B1 | 9/2001 | Kawan |
| 6,292,211 | B1 | 9/2001 | Pena |
| 6,318,536 | B1 | 11/2001 | Korman et al. |
| 6,349,972 | B1 | 2/2002 | Geiger et al. |
| 6,375,080 | B1 | 4/2002 | Cremonese |
| 6,401,010 | B1 | 6/2002 | Takahashi |
| 6,405,182 | B1 | 6/2002 | Cuervo |
| 6,415,262 | B1 | 7/2002 | Walker et al. |
| 6,484,863 | B1 | 11/2002 | Molbak |
| 6,494,776 | B1 | 12/2002 | Molbak |
| 6,505,774 | B1 | 1/2003 | Fulcher et al. |
| 6,536,037 | B1 | 3/2003 | Barrese et al. |
| 6,554,184 | B1 | 4/2003 | Amos |
| 6,704,039 | B2 | 3/2004 | Pena |
| 6,705,448 | B1 | 3/2004 | Steel |
| 6,736,251 | B2 | 5/2004 | Molbak |
| 6,758,316 | B2 | 7/2004 | Molbak |
| 6,854,581 | B2 | 2/2005 | Molbak |
| 6,976,570 | B2 | 12/2005 | Molbak |
| 7,028,827 | B1 | 4/2006 | Molbak et al. |
| 7,131,580 | B2 | 11/2006 | Molbak |
| 2002/0026423 | A1 | 2/2002 | Maritzen et al. |

FOREIGN PATENT DOCUMENTS

| | | |
|---|---|---|
| CA | 2060630 | 11/1992 |
| CA | 2067987 | 11/1992 |
| CH | 680171 | 6/1992 |
| DE | 660354 | 5/1938 |
| DE | 25 28 735 | 9/1976 |
| DE | 30 21 327 | 12/1981 |
| DE | 3147603 | 6/1983 |
| EP | 0313294 | 4/1989 |
| EP | 0 351 217 | 1/1990 |
| EP | 0 420 163 | 4/1991 |
| EP | 0 477 722 | 4/1992 |
| EP | 0857579 | 8/1998 |
| EP | 0 924 662 | 6/1999 |
| EP | 0 924 664 | 6/1999 |
| EP | 0 924 665 | 6/1999 |
| EP | 1178448 | 2/2002 |
| FR | 2 042 254 | 2/1971 |
| FR | 2 342 531 | 9/1977 |
| FR | 2845189 | 4/2004 |
| GB | 958741 | 5/1964 |
| GB | 1564723 | 4/1980 |
| GB | 2095452 | 9/1982 |
| GB | 2121582 | 12/1983 |
| GB | 2153128 | 8/1985 |
| GB | 2175427 | 11/1986 |
| GB | 2186411 | 8/1987 |
| GB | 2188467 | 9/1987 |
| GB | 2198274 | 6/1988 |
| GB | 2 223 872 | 4/1990 |
| GB | 2223340 | 4/1990 |
| GB | 2255666 | 11/1992 |
| JP | 52-49892 | 4/1977 |
| JP | 52-50296 | 4/1977 |
| JP | 1-258092 | 10/1989 |
| JP | 1-307891 | 12/1989 |
| JP | 0081193 | 3/1990 |
| JP | 3-63795 | 3/1991 |
| JP | 3-92994 | 4/1991 |
| JP | 403252795 | 11/1991 |
| JP | 4-315288 | 11/1992 |
| JP | 4-344995 | 12/1992 |
| SE | 44-244 | 9/1918 |
| SE | 44-247 | 9/1918 |
| SE | 50-250 | 11/1919 |
| SE | 8801851 | 11/1989 |
| WO | WO-94/06101 | 3/1994 |
| WO | WO-94/09440 | 4/1994 |
| WO | WO-95/30215 | 11/1995 |
| WO | WO-96/30877 | 10/1996 |
| WO | WO-99-50785 | 10/1999 |
| WO | WO-00-10138 | 2/2000 |

OTHER PUBLICATIONS

Cohen, P., "Coinstar Turns Loose Change into iTunes Songs," Yahoo News, http://news.yahoo.com/s/macworld/20060410/tc_macworld/coinstar20060410_0, Apr. 10, 2006, pp. 1-3.

Sheehan, Michael, "Marriage of Convenience," 3 pages http://www.kioskbusiness.com/NovDec01/articles/article4.html [accessed May 19, 2003].

Accessories Brochure, undated, 3 pages.

Answer To Amended Complaint For Patent Infringement And Counterclaim For Declaratory Judgment; Case No. C-97 20536 E.I.;

United States District Court, Northern District of California, San Jose Division; filed Nov. 2, 1998, 11 pages.
Australian Patent Office, Examiner's First Report, May 11, 1999, Australian Application No. 71948/98, 2 pages.
Bedienungsanleitung CDS 500/MCC 500, undated, 9 pages.
Cash, M., "Bank blends new technology with service," Winnipeg Free Press, Sep. 4, 1992, 1 page.
CDS Automated receipt giving cash deposti system.
CoinBank Automated Systems, Inc.'s Initial Disclosure of Prior Art Pursuant to Local Rule 16-7, Case No. C-97 20536 EA1, Nov. 20, 1997.
Coinbank Automated Systems, Inc.'s Response to Coinstar Inc.'s Third Set of Interrogatories; *Coinstar, Inc.* v. *Coinbank Automated Systems, Inc.*; Case No. C-97 20536 EAI; United States District Court for the Northern District of California, San Jose Division; filed Mar. 15, 1999.
*Coinstar* v. *CoinBank Automated Systems, Inc.*; Case No. C-97 20536 E.I.; United States District Court, Northern District of California, San Jose Division; Defendant's Notice of Motion and Motion for Summary Judgment or Summary Adjudication of Issues: and Memorandum of Points and Authorities in Support Thereof and attachments; filed Jun. 7, 1999.
Correspondence between Scan Coin and Coinstar, Jan. 7, 1992, 2 pages.
F. Zimmerman Co., "Reference Manual Contovit/Sortovit, Perconta Money Counting and Sorting Systems," Aug. 1995, pp. I-III, 1-31, and three pages of specifications.
Geldinstitute Literature, Mar. 1990 and Apr.-May 1992, 4 pages.
Hamilton, "Turning Cans into Cold Cash," The Washington Post</ i>, Jul. 2, 1991, pp. D1, D4.
Kundenselbstbedienung, undated, 4 pages.
Leitch, C., "High-tech bank counts coin," Report on Business, The Globe and Mail, Sep. 18, 1991, 1 page.
Llemeon, J., "Royal's Burlington drive-in bank provides customers 24-hour tellers," The Toronto Star, Aug. 21, 1991, 1 page.
Newspaper Articles, The Globe and Mail, Sep. 18, 1991.
Order Granting Counter-Defendant's (1) Motion To Dismiss Counterclaim For Declaratory Judgment Based On Unenforceability And (2) Motion To Strike Inequitable Conduct Affirmative Defense, Ordered Sep. 8, 1997, No. C97-20536 EA1.
Oxby, M., "Royal Bank opens 'super branch'," The Gazette Montreal, Sep. 14, 1991, 1 page.
Reis Eurosystems Geldbearbeitungssysteme, "Test-Programme CS 3110 Selectronic coin sorting and counting machine", Jul. 1992, pp. 1-3.
Reis Eurosystems, "Operating Instructions CS 3110 Selectronic Coin Sorting and Counting Machine With Central Sensor", Jul. 1992, pp. 1-12, I-IV.
Scan Coin AB's Answers to Coinbank's First Set of Interrogatories (Nos. 1-13), executed on Nov. 13, 1997, 15 pages.
Scan Coin CDS 640 Cash Deposit System Brochure (2 pages).
Scan Coin CDS Cash Deposit System, undated, 2 pages.
Scan Coin CDS Munzgeldeinzahlungen in Selbstbedienung: Cash Deponier System CDS 500, 1994, 6 pages.
Scan Coin correspondence regarding supermarkets, Sep. 11, 1992, 4 pages.
Scan Coin International Report Apr. 1987, 49 pages.
Scan Coin Money Processing Systems, Oct. 1, 1988, 10 pages.
Scan Coin Newsletter, May 1991, 2 pages.
Scan Coin Sales Invoices for Coin Counters in the United States, 1989-1993, 28 pages.
Scan Coin Technical Manual CDS MK 1 Coin Deposit System; 1991, pp. 1-31.
Scan Coin Technical Manual SC 102 Value Counter, undated, 28 pages.
Scan Coin Technical Referens [sic] Manual, CDS, 1989, 47 pages (odd pages only).
Scan Coin World Newsletters, Scan Coin AB, Jagerhillgatan 26, S-213 75 Malmo, Sweden, 1988-1990, 6 pages.
"Slide Changing Apparatus With Slide Jam Protection", Research Disclosure 30509, Sep. 1989.
Super Branch Literature, Feb. 1992, 2 pages.
Technical Manual Cash Deposit System CDS 600 and CDS 640, 1991, 45 pages.
Technical Specifications GBS9401 SB, undated, 24 pages.
User's Manual Scan Coin CDS 600, Dec. 12, 1990, 14 pages.
User's Manual Scan Coin CDS 640, 1988, 8 pages.
Civil Docket for Case#: 3:06-cv-00299; *Coinstar, Inc.* v. *Coinxchange, LLC*; U.S. District Court, Eastern District of Virginia (Richmond); 10 pages.
Complaint for Patent Infringement; Filed May 2, 2006; Civil Case No. 3:06-cv-00299; United States District Court, Eastern District of Virginia, Alexandria Division; 89 pages.
Defendant's Answer and Counterclaims to Plaintiff's Complaint for Patent Infringement; Filed May 30, 2006; Civil Case No. 3:06-cv-00299; United States District Court, Eastern District of Virginia, Richmond Division, 13 pages.
Third Party Complain of Coin X Change; Filed Jun. 13, 2006; Civil Case No. 3:06-cv-00299; United States District Court, Eastern District of Virginia, Richmond Division; 6 pages.
Memorandum in Support of Coin X Change's Motion to Expedite Proceedings; Filed Jun. 14, 2006; Civil Case No. 3:06-cv-00299; United States District Court, Eastern District of Virginia, Richmond Division; 31 pages with exhibits.
Plaintiff Coinstar, Inc.'s Reply to Counterclaims; Filed Jun. 20, 2006; Civil Case No. 3:06-cv-00299; United States District Court, Eastern District of Virginia, Richmond Division; 6 pages.
Cummins-Allison Corporation's Answer to Third-Party Complaint of Coin X Change; Filed Jun. 30, 2006; Civil Case No. 3:06-cv-00299; United States District Court, Eastern District of Virginia, Richmond Division; 17 pages.
Cummins-Allison's Memorandum in Support of its Motion for Summary Judgment on Counts I-III of Coin X Change's Third Party Complaint; Filed Jun. 30, 2006; Civil Case No. 3:06-cv-00299; United States District Court, Eastern District of Virginia, Richmond Division; 77 pages.
Coin X Change's Opposition to Cummin's Statement of Undisputed Facts; Filed Jul. 11, 2006; Civil Case No. 3:06-cv-00299; United States District Court, Eastern District of Virginia, Richmond Division; 14 pages.
Coin X Change's Opposition to Cummins' Motion for Summary Judgment; Filed Jul. 11, 2006; Civil Case No. 3:06-cv-00299; United States District Court, Eastern District of Virginia, Richmond Division; 82 pages with exhibits.
Plaintiff Coinstar, Inc.'s Response to Coin X Change's Opposition to Motion for Summary Judgment; Filed Jul. 14, 2006; Civil Case No. 3:06-cv-00299; United States District Court, Eastern District of Virginia, Richmond Division; 5 pages.
Cummins-Allison's Reply Brief in Support of its Motion for Summary Judgment on Counts I-III of Coin X Change's Third Party Complaint; Filed Jul. 14, 2006; Civil Case No. 3:06-cv-00299; United States District Court, Eastern District of Virginia, Richmond Division; 29 pages.
Memorandum Opinion; Entered Jul. 28, 2006; Civil Case No. 3:06-cv-00299; United States District Court, Eastern District of Virginia, Richmond Division; 9 pages.
Order Granting Third Party Dft Cummins-Allison's Motion for Summary Judgment with respect to Counts I and II of Coin X Change's Third Party Complain; Entered Jul. 28, 2006; Civil Case No. 3:06-cv-00299; United States District Court, Eastern District of Virginia, Richmond Division; 1 page.
Final Order re Third Party Complaint Only; Entered on Aug. 2, 2006; Civil Case No. 3:06-cv-00299; United States District Court, Eastern District of Virginia, Richmond Division; 1 page.
Stipulation Dismissing '402 and '972 Patents; Entered Nov. 3, 2006; Civil Case No. 3:06-cv-00299; United States District Court, Eastern District of Virginia, Richmond Division; 2 pages.
Defendant's Prior Art Statement; Filed Nov. 14, 2006; Civil Case No. 3:06-cv-00299; United States District Court, Eastern District of Virginia, Richmond Division; 75 pages.
Plaintiff Coinstar, Inc's Memorandum in Support of Proposed Claim Constructions; Filed Nov. 29, 2006; Civil Case No. 3:06-cv-00299; United States District Court, Eastern District of Virginia, Richmond Division; 161 pages with exhibits.

Coin X Change's Statement Regarding Extrinsic Evidence; Filed Nov. 29, 2006; Civil Case No. 3:06-cv-00299; United States District Court, Eastern District of Virginia, Richmond Division; 35 pages with exhibits.
Coin X Change's Claim Interpretation Statement; Filed Nov. 29, 2006; Civil Case No. 3:06-cv-00299; United States District Court, Eastern District of Virginia, Richmond Division; 15 pages.
Coin X Change's Claim Construction Memorandum; Filed Nov. 29, 2006; Civil Case No. 3:06-cv-00299; United States District Court, Eastern District of Virginia, Richmond Division; 144 pages with exhibits.
Stipulation Consenting to Amended Pleading and Joint Motion for Additional Non-Party Depositions; Entered Dec. 1, 2006; Civil Case No. 3:06-cv-00299; United States District Court, Eastern District of Virginia, Richmond Division; 20 pages.
Defendant's First Amended Answer and Counterclaims to Plaintiff's Complaint for Patent Infringement; Filed Dec. 1, 2006; Civil Case No. 3:06-cv-00299; United States District Court, Eastern District of Virginia, Richmond Division; 20 pages.
ORDER regarding the construction of claim terms in Patent Nos. 6,976,570 and 7,028,827; Entered Dec. 21, 2006; Civil Case No. 3:06-cv-00299; United States District Court, Eastern District of Virginia, Richmond Division; 7 pages.
Plaintiff Coinstar, Inc.'s Reply to Amended Counterclaims; Filed Dec. 21, 2006; Civil Case No. 3:06-cv-00299; United States District Court, Eastern District of Virginia, Richmond Division; 7pages.
Scan Coin User's Manual, CDS 600, 1991, 14 pages.
Technical Manual, Cash Deposit System, Model CDS 600 & CDS 640, 1991, 46 pages.
"Kunderna fixar vaxelin," Praktiska, 2 pages.
Svenska Penninglotteriet Documents, 1988, 46 pages.
Fri Kopenskap articles, Mar. 18, 1988, Apr. 27, 1989 and Nov. 25, 1988, 4 pages.
Priab Prisma article, 1989, 7 pages.
Scan Coin CDS Cash Deposit System, Brochure, Sep. 1988, 6 pages.
Scan Coin CDS Mini Cash Deposit System, Brochure, Undated, 2 pages.
Scan Coin 102 Value Counter, Brochure, Undated, 2 pages.
Scan Coin CDS 600 Cash Deposit System, Brochure, Undated, 2 pages.

FIG. 14
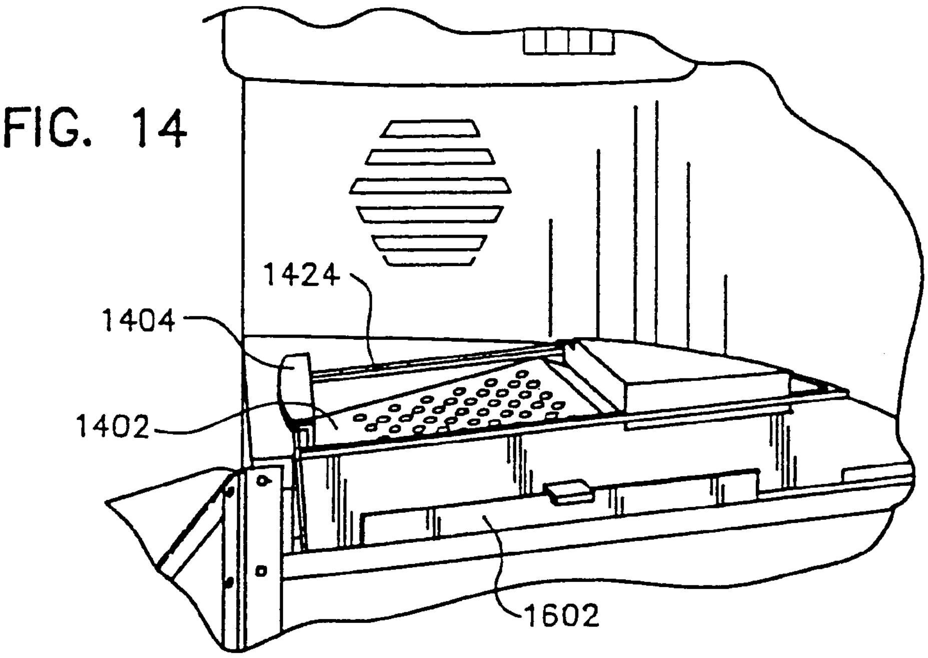
FIG. 15
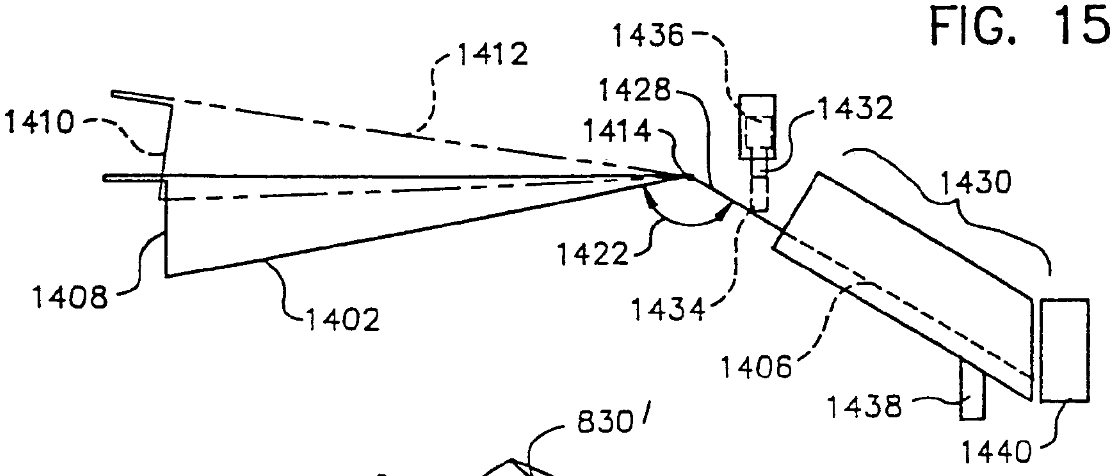
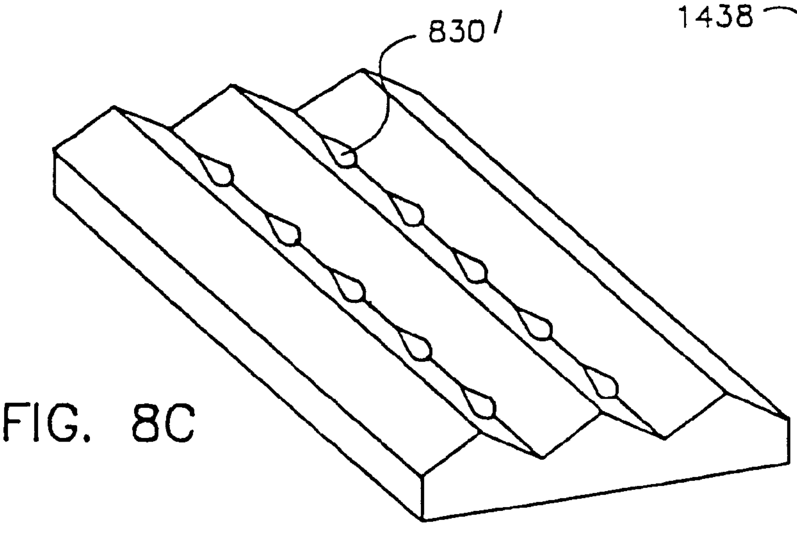
FIG. 8C

COIN COUNTER AND VOUCHER DISPENSING MACHINE AND METHOD

The present application is a continuation of U.S. application Ser. No. 11/225,874 filed Sep. 13, 2005, now U.S. Pat. No. 7,131,580 which is a continuation of U.S. application Ser. No. 10/733,522 filed Dec. 10, 2003, now U.S. Pat. No. 6,976,570 which is a continuation of U.S. application Ser. No. 10/434,384 filed May 7, 2003, now U.S. Pat. No. 6,758,316 which is a divisional of U.S. application Ser. No. 10/119,534 filed Apr. 9, 2002, now U.S. Pat. No. 6,854,581 which is a continuation of U.S. application Ser. No. 09/035,273 filed Mar. 9, 1998, now abandoned, which is a continuation of U.S. application Ser. No. 08/834,952 filed Apr. 7, 1997 (now U.S. Pat. No. 5,799,767), which is a continuation of U.S. application Ser. No. 08/237,486 filed May 3, 1994 (now U.S. Pat. No. 5,620,079), which is a continuation-in-part of U.S. application Ser. No. 07/940,931 filed Sep. 4, 1992, now abandoned, and incorporated herein by reference.

BACKGROUND OF THE INVENTION

The present invention relates to coupon dispensing machines and coin sorting machines.

There are a variety of machines which dispense stamps, tickets, coupons, money orders, bank transactions or the like. One type of machine, shown in U.S. Pat. No. 5,039,848 to Raymond Stoken, dispenses coupons in exchange for money. A display area indicates the different coupons available as well as the specific amount of money required to obtain each particular coupon. Money is inserted into the machine via a coin slot. Control circuitry determines which coupon has been selected, the amount of money required to purchase this coupon, and if the correct amount of money has been inserted into the coin slot. The control circuitry then causes the coupon dispenser to dispense the requested coupon.

Other machines dispense other types of products. For instance, U.S. Pat. No. 5,021,967 to Lawrence Smith is a money order dispensing machine. This machine is meant to be operated by a system operator, not a customer, and therefore does not require the capability to receive money. The machine prints money orders on a dot matrix printer after receiving the necessary data inputs from the operator.

Such previous devices are deficient from the point of view of a consumer with an arbitrary amount of coins, since they require the input of an exact coin value. Further, the device requires a mechanism for determining if the required amount has been deposited and for taking an appropriate action depending on whether the required amount is deposited.

A different variety of machines has been patented which sort coins. One such machine, shown in U.S. Pat. No. 4,995,848 to David Goh uses two methods to sort coins, both methods based on the diameter of the coins. In this machine the coins are loaded into a hopper. A rotating wheel feeds the coins individually onto an inclined ramp. The coins roll down the ramp with their rear surfaces resting against a support surface. Specific denominations are selected when they fall through slots of varying size located in the support surface. Specific denominations are also selected using peeler knives which are arranged at different distances from the ramp surface. These knives topple the coins from the ramp into bins. Using both techniques allows a short ramp to be employed. Another type of machine shown in U.S. Pat. No. 4,059,122 to Yoshio Kinoshita counts the number of coins according to denomination after sorting the coins.

Devices intended for counting/sorting coins are deficient in that the monetary value remains based in the coins, i.e., there is no transfer of the value from the medium of coins to a more convenient form such as a paper form.

Furthermore, a number of counting and sorting devices are deficient for certain other reasons. Many devices, while having some form of waste control device, have been unsuccessful in completely controlling waste which may be mixed in with coins. As a result, many previous devices are only suitable for operation by an experienced or skilled operator and are not suitable for use by the general public who may be less careful about including foreign or waste material among coins. In particular, many previous devices were designed to admit coins into the counting device at such a rate that it was not possible for each coin to be individually exposed to the waste control device, i.e., such that some coins may block others from the waste control system.

Some counting/sorting devices have had complicated or ineffective control of the flow of coins so that it was difficult, or expensive to prevent unacceptably high surges of coin flow from jamming or otherwise overwhelming the sorting/counting mechanism. Some devices were designed to permit only a slow entry of coins into the counting/sorting mechanism but, in some cases, this was done at the expense of the ability to accommodate a high volume of coins and/or has resulted in unacceptably slow operation.

Many previous devices have been designed with insufficient accommodation for maintenance and/or cleaning so that it was difficult or impossible to adequately clean, maintain and/or upgrade such previous devices.

Accordingly, it would be advantageous to provide a device which receives an arbitrary amount of coins, i.e., which does not require insertion of an exact minimum amount and which converts the value of the coin from the inconvenient medium of coins to a more convenient medium. It would be further advantageous to provide a device which provides for effective and efficient waste management such that the device can be used by the ordinary consumer without resulting in jamming or damage of the machine. It would also be advantageous to provide for a device which accommodates a high volume or flow of coins without permitting surges of coin flow which can interfere with the counting/sorting and/or waste management systems, without complicated electro/mechanical machinery and, preferably, taking advantage of a gravity mechanism. It would also be useful to provide a device which efficiently and conveniently provides the sorted coins in a standard sized coin bag which is conveniently accessible.

SUMMARY OF THE INVENTION

The present invention provides an apparatus which can receive a number of unsorted coins. The coins are sorted and counted to determine a total value. The user is issued a voucher for an amount related to the total value.

The present invention offers a valuable service to the retailer in whose store this machine is placed as well as to the actual user. People tend to collect coins at home, finding that carrying large quantities of coins is unwieldy and impractical. Furthermore, spending coins normally requires either placing the coins singularly into product dispensing machines or counting the coins out by hand. This invention allows the user to periodically exchange excess coins for cash vouchers. The user need not first count the coins since the present invention automatically counts the coins. The advantages to the retailer are numerous. First, although the voucher is exchangeable for cash or merchandise, most customers are likely to purchase goods at the store where they exchange their coins. Second, by offering a convenience to their customers, retailers gain the goodwill of these customers. Thus, the present invention provides a voucher issuing machine in which the amount of the voucher is not preset, and also allows coin sorting by a typical consumer.

In one embodiment coins are placed in a hinged hopper tray or "coin tray" built into one of the machine's surfaces. To activate the process the user presses a "start" button (preferably a "soft" button) and then lifts one edge of the tray, causing the coins to fall down a chute to the high speed coin sorting and counting mechanism. Preferably, the hopper tray is configured to be angled downward and away from the chute or "transfer tray." Thus, the hopper, in the lower position, and the transfer tray form an angled or peaked structure which the coins must travel over in order to enter the transfer tray. Preferably, the angles of the transfer tray and hopper are configured such that, as the hopper is lifted, the coins travel over the peak substantially in a single layer such that there is little or no substantial overlie or blocking of a coin travelling over the peak by other coins. After travelling over the peak, the coins pass through a gate or slot. The gate or slot is preferably opened or closed by a solenoid control mechanism.

A waste control system includes a fan, a magnetic system, and various types of perforations in the hopper and the transfer tray. Preferably, the fan blows in a direction from clean-to-dirty, over the top of the hopper, thus blowing each coin individually as it passes over the peak. In one embodiment, there is a split-path or dual path for the cleaning airflow, one path being over the peak and another path being up through the hopper perforations. Preferably, the magnet is configured at or near the peak such that each coin (or waste item) is exposed to the magnet without being blocked by other coins or items. Coins are counted and sorted by denomination and then dropped into standard-sized coin bags. In one embodiment, as the coins are counted, the total monetary value is displayed on a video screen as well as the number of coins counted within each denomination. A controller prints and dispenses a cash voucher to the user via a slot in the machine's surface.

Besides exchanging cash vouchers for coins, one embodiment of the invention dispenses manufacturers' coupons from a separate slot redeemable for various bargains. These coupons are dispensed at no cost to the user. Preferably, this coupon dispenser can operate either in conjunction with, or independently from the coin sorter and voucher dispenser. A second type of coupon to be dispensed in one embodiment are store coupons. In one embodiment, these coupons are good only for specific bargains unique to that store (or chain of stores). For example, the store manager may have a surplus of a particular item and therefore wish to offer a "two-for-one" bargain for a limited time. Selected products and bargains may also be promoted on the video display. These promotional techniques have the advantage of being easily alterable; thus an individual store manager can tailor the store coupons/ads depending upon factors such as the time of day (e.g., midday grocery store shoppers versus after work shoppers versus late night shoppers) while the chain store owner can vary the store coupons/ads depending upon a particular store's location and needs (e.g., deli shop versus bakery shop versus floral shop).

Generally, in the prior art, coins are either inserted into a machine singularly, or in the case of large commercial sorting machines, by trained personnel. In the present invention, non-trained personnel will dump large amounts of coins into the hopper tray. These untrained users are likely to empty their personal containers, such as old cans or bottles, directly into the hopper without first inspecting the coins. Thus lint, tokens, liquids and various other objects will probably accompany the coins into the machine. Therefore, a method of waste management is used to insure that the machine is not damaged during use.

In one embodiment, the user dumps coins into a hopper tray which doubles as an inspection area. The bottom of the hopper tray is perforated, thus allowing small foreign objects to fall through the perforations instead of entering the coin sorting mechanism. While the coins are in the hopper, the user has an opportunity to remove large foreign objects. The perforations also permit a flow of air, preferably in a direction up through the bottom of the hopper tray and away from the peak and/or the machine, to blow light material off the coins. After inspecting the coins, the user first presses a "go" button indicating the wish to use the machine, and then lifts one edge of the hinged tray, causing the coins to fall down a waste management chute. If desired or needed, the user can guide coins out of the hopper and over the peak by hand. The chute leads to the coin sorting and counting mechanism. In one embodiment, when the "go" button is pressed, the coin sorter starts, the coin counter is initialized, and a fan within the waste management chute is activated. The fan blows light weight debris, such as lint and dust, out of the chute and away from the coin counter/sorter mechanism. The bottom surface of the waste management chute is a grooved and porous plate which allows any fluids dumped into the machine to be removed from the coins and collected. This helps to avoid possible damage to the machine. Magnetic strips are placed preferably along the entrance and exit areas of the chute, to extract any magnetic or magnetically susceptible items, such as magnetic tokens and/or foreign coins which may have been included with the coins.

In one embodiment, the device includes features to prevent undesired surges in the flow of coins, e.g., to prevent or avoid jamming and to assist in waste management. The peak configuration between the hopper and the transfer tray described above, contributes to controlling the flow of coins into the hopper tray since the configuration provides that the coins will be moved over the peak in single layers or planes thus, avoiding excessive coin flow surges. The coins, after travelling over the peak, pass through a gate, having a height adjusted to further assure that coins travel down the transfer tray in single layers or planes. Preferably, the gate can be closed or opened, e.g., by a solenoid-controlled gate so that movement of items down the transfer tray is blocked until the desired time (e.g., until the user has pressed the "go" button and/or has initially lifted the hopper). Further, the pivoted hopper tray, because of its angle in the lower or resting position, provides for self-clearing since, when the hopper is lowered to its resting position, the coins tend to fall away from the peak and the chute, back into the hopper and do not continue to move over the peak in normal conditions.

Preferably, the apparatus is controlled by an intelligent controller, e.g., a computer such as a 486-class computer, and is provided with multiple resources and capabilities for interaction with the user, with the store owner or other manager of the apparatus and with maintenance services and/or personnel. In one embodiment, the computer includes a sound board for providing aural communication as well as video communication. In one embodiment, the computer includes a modem for remote communication to, for example, a central or a regional (out of store) location, e.g., for downloading information such as new coupons, additional video or audio displays, sales or other promotional information and the like. In one embodiment, the modem can also be used for communication with maintenance services or personnel, for example, for diagnosing malfunctions, downloading modifications or upgrades to the software and the like. Preferably, the computer can retain and transfer statistical information such as information relating to customer usage of the sorter/counter, customer usage of dispensed coupons and the like.

In one embodiment, the device is configured for ease of construction, maintenance, and cleaning. For example, in one embodiment, the device is configured so that all major components can be fully exposed, (e.g., by opening doors) without being obstructed by cross-bracing or other supports. Preferably, many components are mounted on rails or rollers so that they can be fully or partially withdrawn for cleaning and/or maintenance.

BRIEF DESCRIPTION OF THE DRAWINGS

FIG. 8C is a diagram of a bottom plate of the transfer tray according to an embodiment of the present invention;

FIG. 14 is a perspective view of an angled coin tray and peak structure according to an embodiment of the present invention;

FIG. 15 is a cross-sectional view of an angled coin tray, peaked structure and transfer tray according to an embodiment of the present invention.;

DESCRIPTION OF THE SPECIFIC EMBODIMENTS

Figure 12:
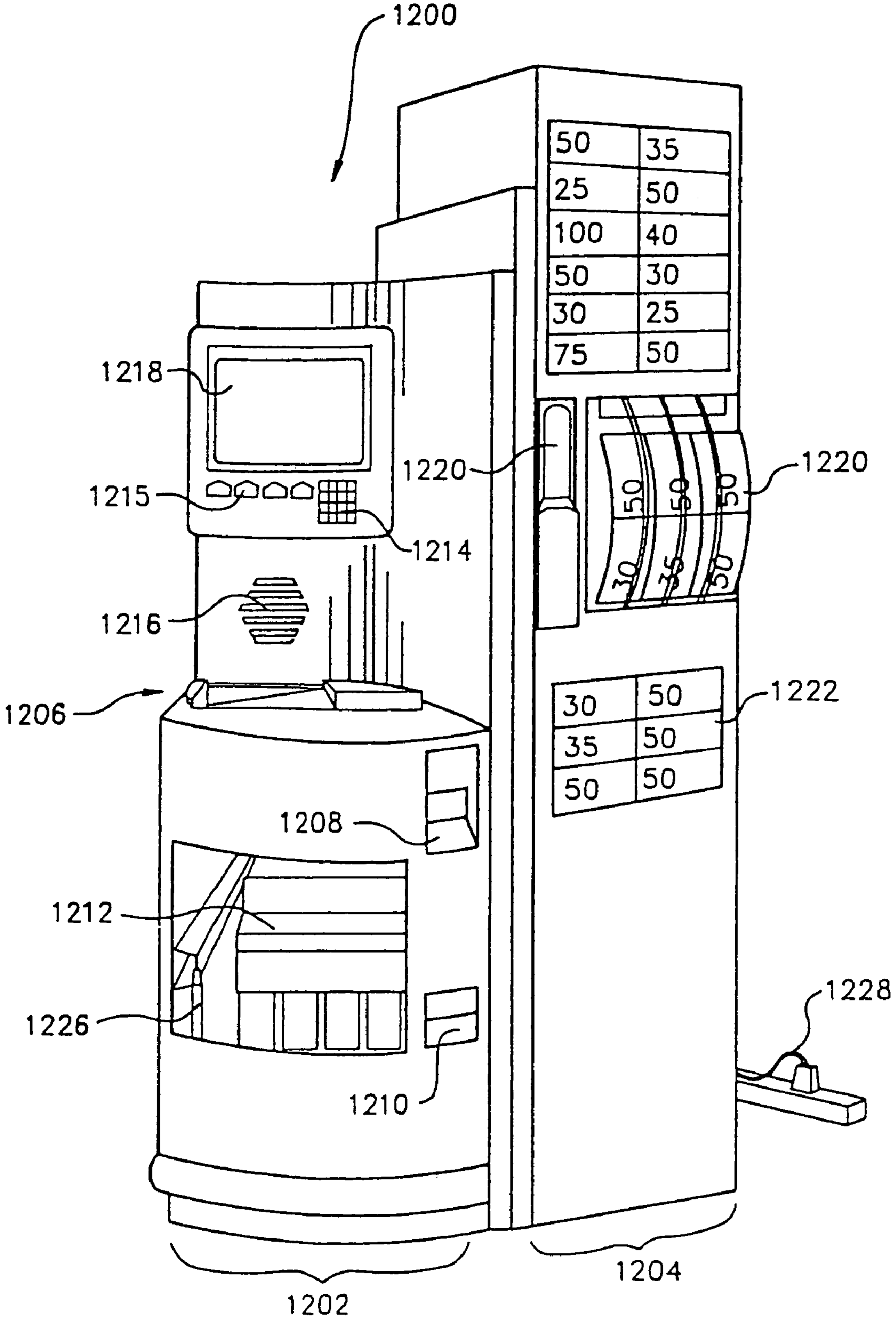
FIG. 12 is an elevational view of the exterior of a coin exchange apparatus according to one embodiment of the invention.

FIGS. 12-18 depict a coin counter/sorter and coupon/voucher dispensing device according to one embodiment of the invention. In the embodiment of FIG. 12, the device generally includes a coin counting/sorting portion 1202 and a coupon dispensing portion 1204. In one embodiment, these portions can operate independently in the sense that it is possible for the coin counting portion 1202 to be counting one customer's coins while the dispensing portion 1204 is dispensing coupons and/or vouchers to another customer. In the depicted embodiment, the coin counting portion 1202 includes an input tray or hopper 1206, a voucher dispensing slot 1208, a coin return slot 1210, a sorting/counting mechanism 1212, and customer I/O devices, including a keyboard 1214, additional keys 1215, a speaker 1216 and a video screen 1218. The coupon dispensing portion includes an activating device 1220 such as a button and coupon receptacle 1222. The apparatus 1200 can include various indicia, signs, displays, advertisement and the like on its external surfaces. In the depicted embodiment, portions of the counting/sorting mechanism are visible through a window 1226. A power cord 1228 provides power to the mechanism as described below.

Figure 13:
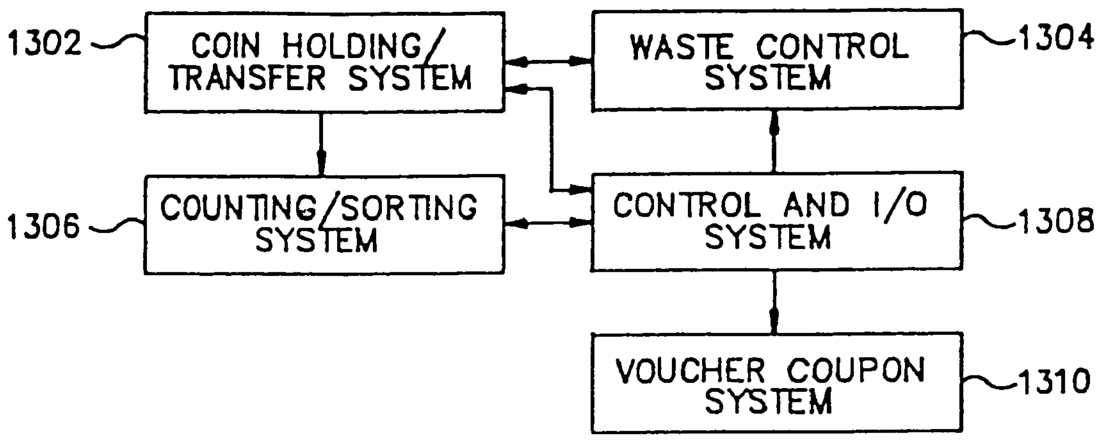
FIG. 13 is a block diagram showing major systems of an apparatus according to an embodiment of the present invention.
Figure 16:
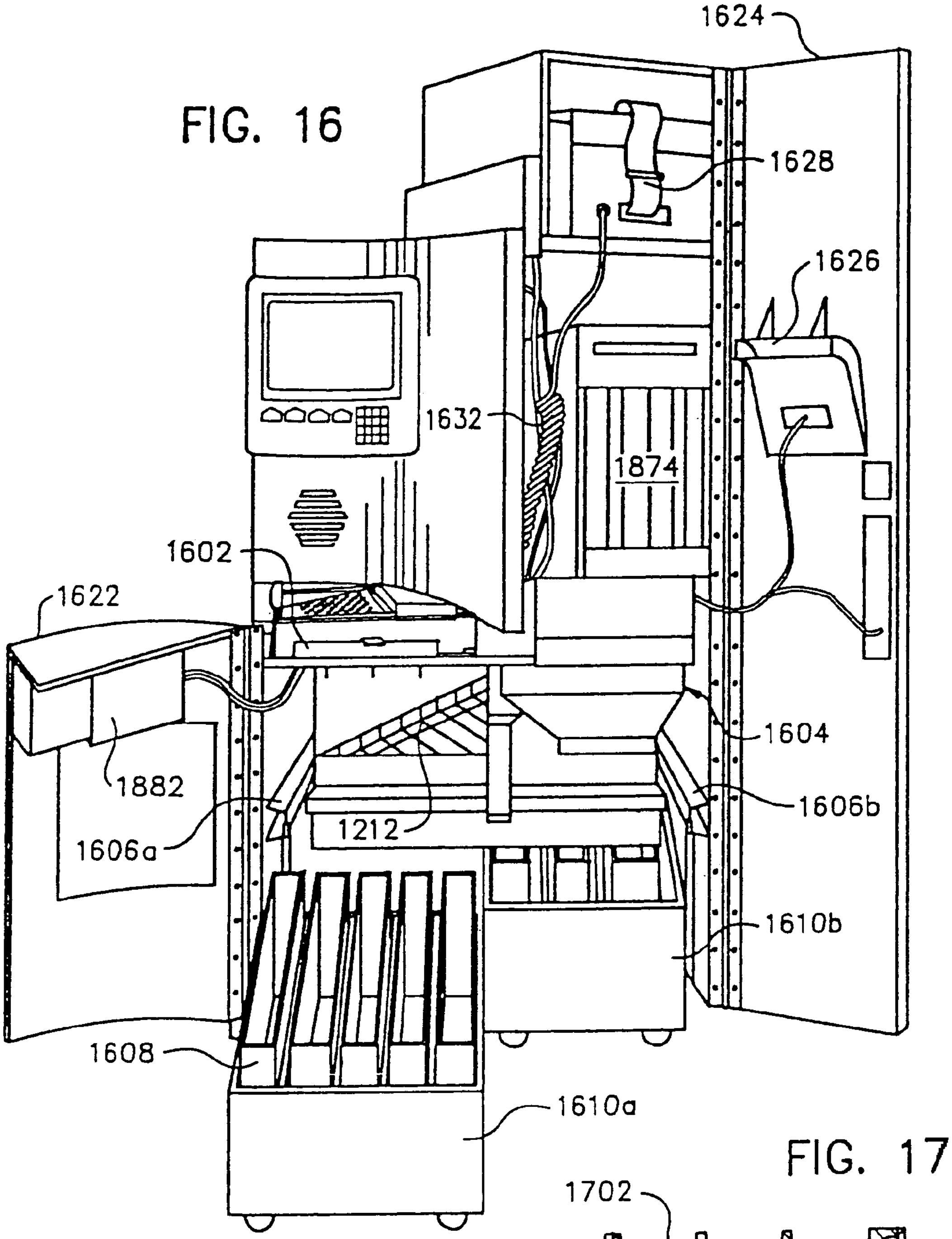
FIG. 16 is an elevational view of the apparatus according to the present invention with doors in the open position showing a number of the interior components.

The depicted embodiment includes a number of interacting systems, as shown in FIG. 13, including the coin holding/transfer system 1302, a waste control system 1304, the counting/sorting system 1306, a control and I/O system 1308, and a voucher/coupon system 1310. In the depicted embodiment, the coin-holding transfer system 1302 includes the pivoting tray or hopper 1206, a transfer tray configured to form a peaked coin input system and a solenoid and gate system as depicted in FIG. 15. The waste control system 1304, in one embodiment, includes perforated flow-through surfaces of the hopper 1206, a slot and spout system in the transfer tray, a waste tray, a magnet system and a fan or blowing system, as described more thoroughly below. The counting/sorting system includes a coin hopper, a coin counter, coin sorter and coin collection bags, as depicted in FIG. 16. The voucher/coupon system includes one or more dispensers and/or printers for dispensing and/or printing vouchers or coupons in response to customer input, as depicted, for example, in FIG. 16. The control and I/O system is provided for coordinating the operation of the waste control system, the coin holding/transfer system, the counting/sorting system and the voucher/coupon system. Preferably, the control and I/O system receives and provides appropriate information and instructions to and from the user, and, in one embodiment, can be used for sending and receiving information to and from remote sites such as for receiving operating information (such as discount information, coupon information, updated software) and providing malfunction or diagnostic or statistical information.

Figure 7:
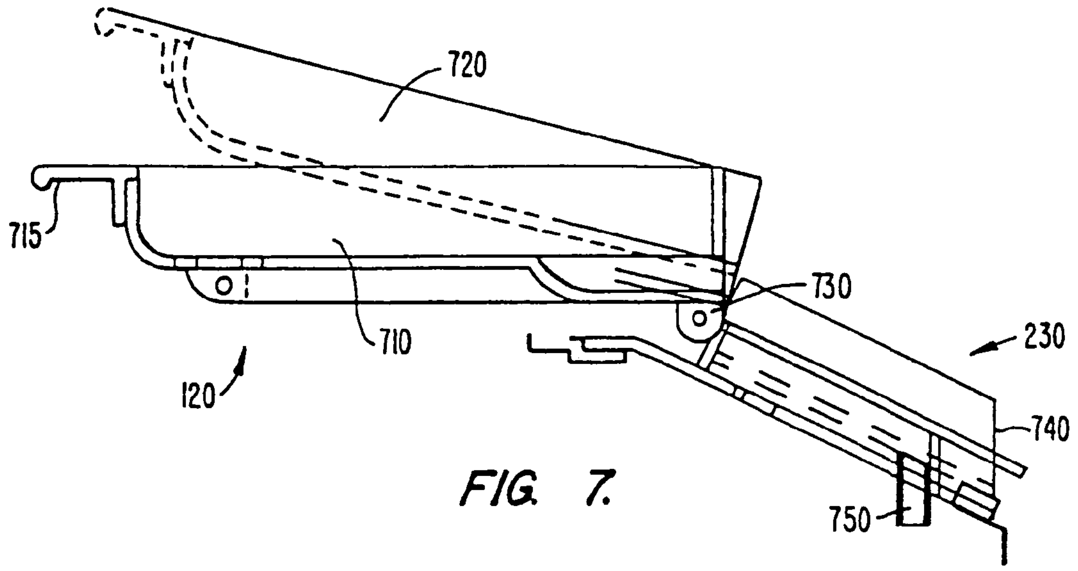
FIG. 7 is a side view of the coin tray and the waste management system.

FIG. 7 depicts a pivoting tray system according to one embodiment of the present invention. In this system, the tray 120, in the rest position 710, has a bottom surface with is substantially horizontal. Coins can be fed into the transfer tray 230 by lifting the handle 715, causing the coin tray 120 to pivot about point 730, so that the force of gravity can cause coins to move to the transfer tray 230.

In some cases, it has been found that the configuration depicted in FIG. 7 is less than optimal. When the coins are placed on the horizontal surface, they reside in a pile or heap which is elevated above the pivot point 730. Accordingly, as the coins are moved onto the transfer tray 230, they may, depending on the volume of coins placed in the tray 120 travel into the transfer tray 230 in a surge of coins. This surge can overwhelm and/or jam the downstream counting/sorting mechanism. This problem is compounded by the fact that, if a large volume of coins is placed in the tray, once jamming occurs, it may be of little avail to return the tray to its horizontal position since this will not serve to move coins away from the transfer tray 230 and may even fail to stop the flow of coins into the transfer tray 230. In the embodiment of FIG. 7, coins will commonly move into the transfer tray 230 in a flow or mass of coins which is several coins deep such that some coins are lying on top of others as the coins travel into the transfer tray 230. This configuration of coin flow interferes with effective cleaning of the coins and contributes to jamming.

FIG. 14 depicts a coin tray or hopper according to another embodiment of the invention. In the embodiment of FIG. 14, the bottom surface 1402 of the tray 1206, when the tray is in the rest or lowermost position is angled downward in a direction away from the transfer tray. In this way, even when the hopper 1402 is filled to the rim, the coins will not begin flowing into the transfer tray 1406 until the user begins lifting the tray, such as by lifting handles 1404. As the user lifts the hopper from the lowermost position 1408 to an upper position 1410, coins heaped up to the upper rim 1412 will be positioned higher than the pivot point or peak 1414. The first coins to reach a critical height above the peak 1414 will begin sliding and will eventually move over the peak 1414 and into the transfer tray 1406. The peak 1414 has an angle such that in general, as the tray is lifted, coins will travel over the peak 1414 in a single plane or layer, such that, in general, there will be substantially little or no overlap of one coin over another. As described more thoroughly below, this type of coin flow provides a number of advantages. It assists in the waste management system because it makes it possible to expose each coin individually to a magnetic system and/or blowing system without one of the coins blocking another coin from the waste management system. It also assists in preventing undesirable surges or large flows of coins into the transfer tray 1406 since the flow of coins is limited by the fact that, generally, only a single layer of coins travels over the peak 1414 at a given time. The system is also useful because it is self-clearing in the sense that if a large coin flow is experienced, the user can allow the tray to move downward towards its lowermost position 1418 which will cause coins to move in a direction away from the tray 1406, thus clearing the entrance to the transfer tray 1406. Preferably, the bottom of the tray 1402 is at an angle with respect to horizontal, between about 10° and about 15°, preferably between about 11° and about 12° and is more preferably at an angle of about 11.56°. The initial downward slope of the transfer tray is inclined with respect to horizontal, at an angle of between about 25° and 35°, preferably between about 28° and about 31° and more preferably at an angle of between about 30°. Thus, the angle 1422 between the bottom surface of the coin tray and the initial slope of the transfer tray is between about 135° and 140°, preferably about 138°.

In one embodiment, it has been found useful to provide a material to fill the crack 1424 around the edge of the coin tray. Providing this material has been found useful in preventing coins from falling into the crack and preventing pinching of user's fingers. In one embodiment, a stiff-looped material such as that sold under the tradename Velcro™ (preferably, using only the loop material and not the hook material) has been found useful, although other materials such as felt, rubber, plastic and the like may be used.

As shown in FIG. 15, the transfer tray 1406 includes an initial sloped portion 1428 and a downstream portion 1430. Preferably, the initial sloped portion 1428 as well as the bottom surface 1402 of the coin tray 1402, is provided with a number of perforations useful in the waste management system as described more thoroughly below. A gate is positioned over the initial portion 1428 and is movable from an upper open position 1432 to a lowered or closed position 1434. In one embodiment, the gate movement is achieved by a controllable solenoid 1436, controlled by the control and I/O system 1308, as described more thoroughly below. The open gate 1432 defines a slot through which the coins, after passing over the peak 1414 must pass. This slot is closed by the gate when it moves to the lower position 1434. Preferably, the gate remains in the lower position 1434 until the user initiates the counting/sorting process (e.g., by pushing the start button) in order to prevent entry of foreign material into the counting/sorting system during idle periods. In some embodiments, the gate is moved to the closed position in response to a jam or other malfunction of the counting/sorting mechanism. The size of the slot defined by the gate also assists in preventing undesirable flow or surge of coins by preventing the passage of a flow of coins greater than a predetermined thickness such as greater than a single layer or plane of coins.

Figure 8A:
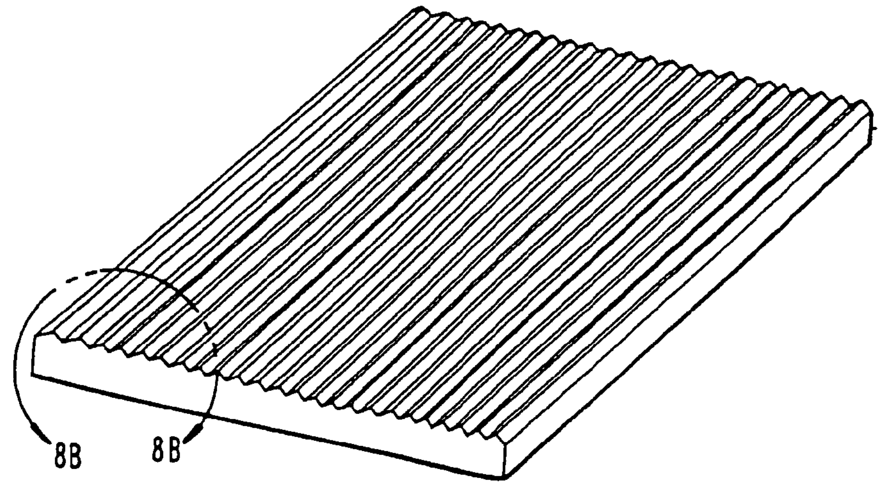
FIGS. 8A and 8B are diagrams of the bottom plate of the waste management system.
Figure 8B:
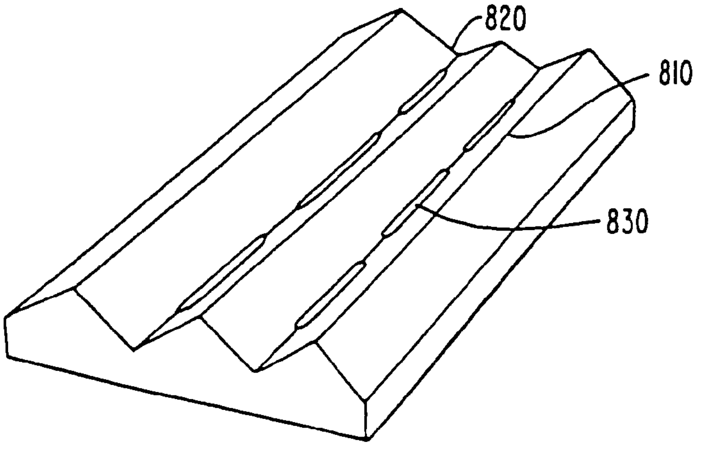

The lower portion 1430 of the transfer tray has a lower surface 1406 having a plurality of grooves running lengthwise, as depicted in FIGS. 8A and 8B. This allows the coins to ride along the peaks while liquids or other wastes flow or travel down the valleys 820. In the embodiment depicted in FIG. 8B, a number of perforations are formed in the valleys of the transfer tray. In one embodiment, the perforations have a substantially asymmetric "teardrop" shape with the narrowest region of the perforation pointing towards the peak 1414, as depicted in FIG. 8C. This configuration is believed to be particularly effective in removing waste material such as liquids. The waste material that passes through the perforations 830' are funnelled to a spout 1438 which empties into a waste tray as described below.

The perforations in the lower part of the transfer tray 1430 and the funnel and spout 1438 form part of the waste control system 1304. The perforations in the upper portion of the transfer tray 1428 and the coin tray or hopper 1206 also are part of the waste control system 1304 since these perforations allow dense waste material with a size smaller than the perforations to fall through the perforations and thus to be separated from the coins. Materials falling through these perforations and the material output from the spout 1438 are collected in a waste tray 1602, as seen in FIG. 16. FIG. 16 shows the apparatus of FIG. 12 with the cabinet doors in an open position showing certain interior structures of the apparatus. Waste tray 1602 is configured to lie beneath the perforated portions of the hopper 1206, upper transfer tray 1428 and spout 1438 and to receive materials which pass through these devices. The waste tray 1602 is configured to be drawn out in a drawer-like fashion for emptying waste material. In one embodiment, the waste tray 1602 has a capacity at least equal to 12 fluid oz. so as to be able to receive and contain, for example, the spilled contents of a typical soft drink can.

The perforations in the hopper 1206 and upper transfer tray 1428 also can provide a second function in a waste control system. In this second function, a device is provided for blowing air upward through the perforations so as to blow lightweight material off of the coins and away from the counter/sorter. Preferably, one or more fans are provided for this purpose. The fans can be controlled by the control I/O system 1308, e.g., to become activated upon pushing the activate or go button 1215. Preferably, the air flow is configured to flow in a countercurrent fashion, i.e., to blow in a direction from the clean region towards the dirty region, i.e., from the region of the counter/sorter towards the transfer tray and coin tray. In one embodiment, two separate fans are provided. One fan provides flow through the perforations in the bottom of the hopper and the upper portion of the transfer tray 1428, 1402. Another fan provides for air flow through the open gate 1432 and over the peak 1414. This flow is useful in individually cleaning the coins as they pass, in a single layer, over the peak 1414 since, in this configuration, each coin will be individually subjected to the air flow. In one embodiment, the second fan is configured in a box structure 1440 to provide more efficient air flow up the transfer tray 1432 and over the peak 1414. The channeling of flow through the open gate 1432 and/or similar structure produces a convergence or "wind tunnel" effect so that a relatively high air velocity is provided at the peak 1414 for efficient cleaning of the coins.

Coins which are output from the coin holding/transfer system 1302 are provided to the counting/sorting system 1306. A coin hopper 1604 receives the coins from the transfer tray 1430 and provides these coins to the counter-sorter mechanism. A number of counter-sorters can be used. In one embodiment, Skycam Model 640 is used. Other sorter-counters include those sold by Brandt, Inc. and Hitachi, Ltd. As depicted in FIG. 16, the hopper and sorter/counter are mounted on rails 1606*a*, 1606*b* so that they can be pulled outward for ease of cleaning, maintenance, replacement and the like. In one embodiment, the hopper 1604 can be tilted upward for additional ease of cleaning and maintenance.

Figure 17:
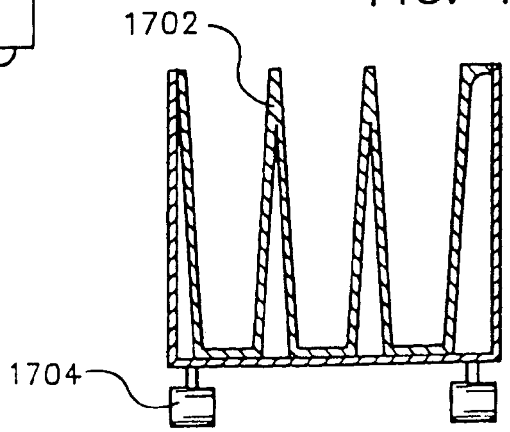
FIG. 17 is a cross-sectional view of a coin bag trolley according to an embodiment of the present invention.

The counter/sorter outputs the coins, according to various denominations of the coins into a plurality of coin bags 1608 positioned in one or more rolling, removable trolleys 1610*a*, 1610*b*. In the depicted embodiment, the coin bags 1608 are standard sized coin bags to facilitate disposition of the coins, such as deposit with a bank. Preferably, the sorter is configured to place up to a predetermined amount of coins of a given denomination into particular bags so that each bag, when filled by the sorter, will contain a known amount of coins. Once one bag is filled with a given denomination, the sorter can begin placing that denomination of coins into a second bag. Alternatively, the counter can output coins to one of a plurality of bags designated for that denomination coin without keeping track of how many coins have been placed in which bag. As shown in FIG. 17, the receptacles for the bags are preferably tapered in shape 1702 so that, once the bags are filled with coins, they can be easily removed from receptacles without jamming. Casters 1704 facilitate withdrawal from the apparatus 1200 e.g., for removal of full coin bags, and transfer to a desired location. Although FIG. 16 shows trolleys 1610*b* configured to accommodate 5 and 3 bays, respectively, other configurations can be used. In one embodiment, each trolley is configured to accommodate two rows of bags, a front row and a rear row, with eight bags in each row.

In one embodiment, the apparatus provides for restricted access to the counted coins, i.e., the coin bags, such as by a mechanical and/or electronic lock which restricts access. In one embodiment, the coin bags will normally be accessed only by authorized money transfer agencies, such as a armored car service and would not normally be accessible by, for example, store personnel. Preferably, store personnel are able to access the interior of the device such as by opening doors, as depicted in FIG. 16, without normally having access to the locked coin bags. In one embodiment, the apparatus detects and stores in memory any access to the coin bags, such as by unlocking the coin bag locks. Preferably, the apparatus will store such information as the time of access, the mode of access and/or the identity code of the person accessing the coin bags. In one embodiment, the apparatus will also record in memory information regarding other types of access to the machine, such as any access by store personnel to the interior of the device, even though it may not include access to the coin bags.

Operation of the counting/sorting system 1306 is controlled by the control I/O system 1308. In one embodiment, the counting and sorting system is activated in response to the user pushing the activate or "go" button 1215. The counting/sorting system 1306 also provides information back to the control and I/O system 1308. The control and I/O system receives information regarding the results of the counting process, in particular, information relating to the number of coins and/or value of coins which have been counted. Preferably, this information is displayed on the screen 1218, along with instructions, advertising, attraction displays and the like. Preferably, the counting/sorting system also provides information to the control and I/O system 1308 regarding its status, such as a detected jam or other malfunction or the empty state of the hopper or counter/sorter.

In one embodiment, the microprocessor can respond to a detected jam in such as way to, in many cases, clear the jam automatically (i.e., without requiring intervention by, e.g., store personnel). In one embodiment, the apparatus temporarily suspends flow of coins into the counter, e.g., so as to accumulate a number of coins in the hopper 280. After coins are accumulated in the hopper, the microprocessor suddenly permits the accumulated coins to enter the counter so as to, in many cases, use the sudden flow of coins for a means for dislodging a jam. In this way, it is possible to use the microprocessor-controlled flow of coins to achieve clearing of at least some types of counter jams without having to perform any substantial modification on the coin counter, e.g., by using software.

The control and I/O system, after a predetermined period has elapsed, following an empty state signal from the counting/sorting system, can output a signal to the voucher/coupon system 1310 to issue a voucher, optionally after verifying with the user (e.g., via the keyboard) that all desired coins have been input into the system. The voucher/coupon system 1310 then outputs a voucher related to the value of the coins counted by the counting/sorting system. In one embodiment, the voucher has a value equal to the value of the counted coins. In another embodiment, as an inducement for using the counting/sorting system, the voucher may be for an amount greater than the counted amount. In one embodiment, the excess amount may be usable only at the retail location where the apparatus 1200 is installed. In another embodiment, as a means of deriving income from the counter/sorter system, the voucher may be for an amount less than the counted amount such as by deduction of a fixed service fee or a percentage service charge.

In the depicted embodiment, the voucher is output by a printing system. Preferably, the printing system is a non-impact printing system so as to reduce the amount of noise generated by the system. The non-impact system can be a thermal printing system, laser printing system, inkjet system or the like. If the noise can be tolerated, an impact system can also be used.

The voucher is redeemable, preferably, at the retail location where the apparatus 1200 is installed. In one embodiment, the voucher is redeemable only for merchandise purchased at the retail location where the apparatus 1200 is installed. In another embodiment, the voucher can be redeemed either for merchandise or for the cash value of the voucher. In still another embodiment, the value of the sorted coins can be transferred to one or more accounts held by the customer, such as by an electronic transfer of the amount to these customer's bank account. In one embodiment, the apparatus 1200 includes a magnetic card reader, e.g., for reading a magnetically-encoded bank card to facilitate transfer of the funds to the user's bank account.

Preferably, the apparatus 1200 also has the capability for outputting coupons or other marketing or advertising material. In one embodiment, coupons are output whenever a voucher is output, both to provide an inducement for using the sorter/counter and to encourage the user to employ the voucher for purchasing goods, rather than obtaining cash equivalent.

Although, preferably, the vouchers are printed within the apparatus 1200, it is also possible to dispense pre-printed vouchers and/or coupons. Preferably, the vouchers and/or coupons include security devices to guard against counterfeiting.

In one embodiment, the voucher dispensing system can be run independently of the coupon dispensing system. This can be achieved, for example, by having independent voucher printers and coupon disperses, each controlled in response to the control and I/O system. Preferably, coupons are dispensed to a user whenever the user uses the device 1200 for counting coins and receiving a voucher. Preferably, the coupon dispensing system can be used independently from and simultaneously with the counting/sorting and voucher dispensing system. For example, the device can be configured such that while a first customer is waiting for the device to finish counting and sorting coins, a second user can request and receive coupons from the machine. In one embodiment, coupons are dispensed in response to the user inserting a coin in a coin slot. Preferably, the device is configured such that any coin inserted in the coin slot is immediately returned to the user, along with at least one coupon. Thus, the coin slot used in conjunction with the coupon dispenser is a means for informing the apparatus 1200 that a user wishes to receive coupons. Other items for requesting coupons (or providing other user I/O) could be used such as a push button, keyboard, handwritten input or handwriting recognition, voice recognition and the like.

In one embodiment, vouchers and/or coupons include printed information relating to items available for sale in the store in which the apparatus 1200 is installed. In one embodiment, the apparatus 1200 can be programmed and, as needed, updated to include information specific to the particular store location. For example, the voucher and/or coupon can be printed including a "shopping list" format which includes information regarding the location, in this particular store, of items for sale. For example, the coupons can be printed including information about which aisles the products for which the coupons apply are located in.

Figure 18:
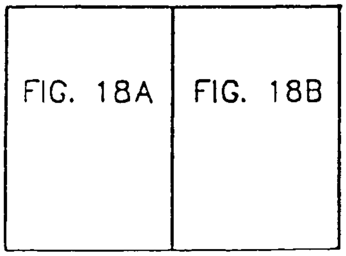
FIG. 18 is a block diagram of components of the control and I/O system, waste control system, and counting/sorting system, according to one embodiment of the present invention.
Figure 18A:
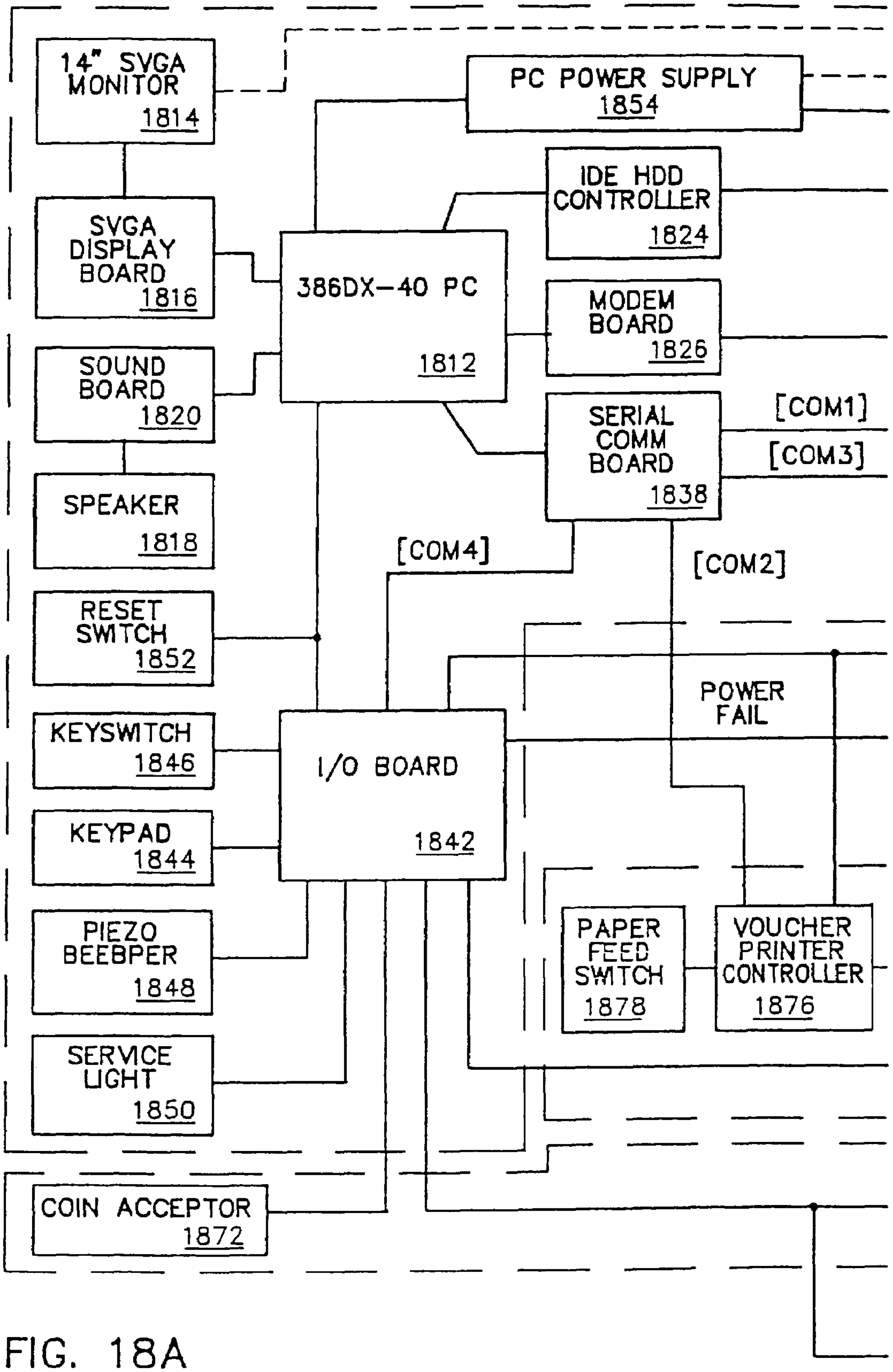
Figure 18B:
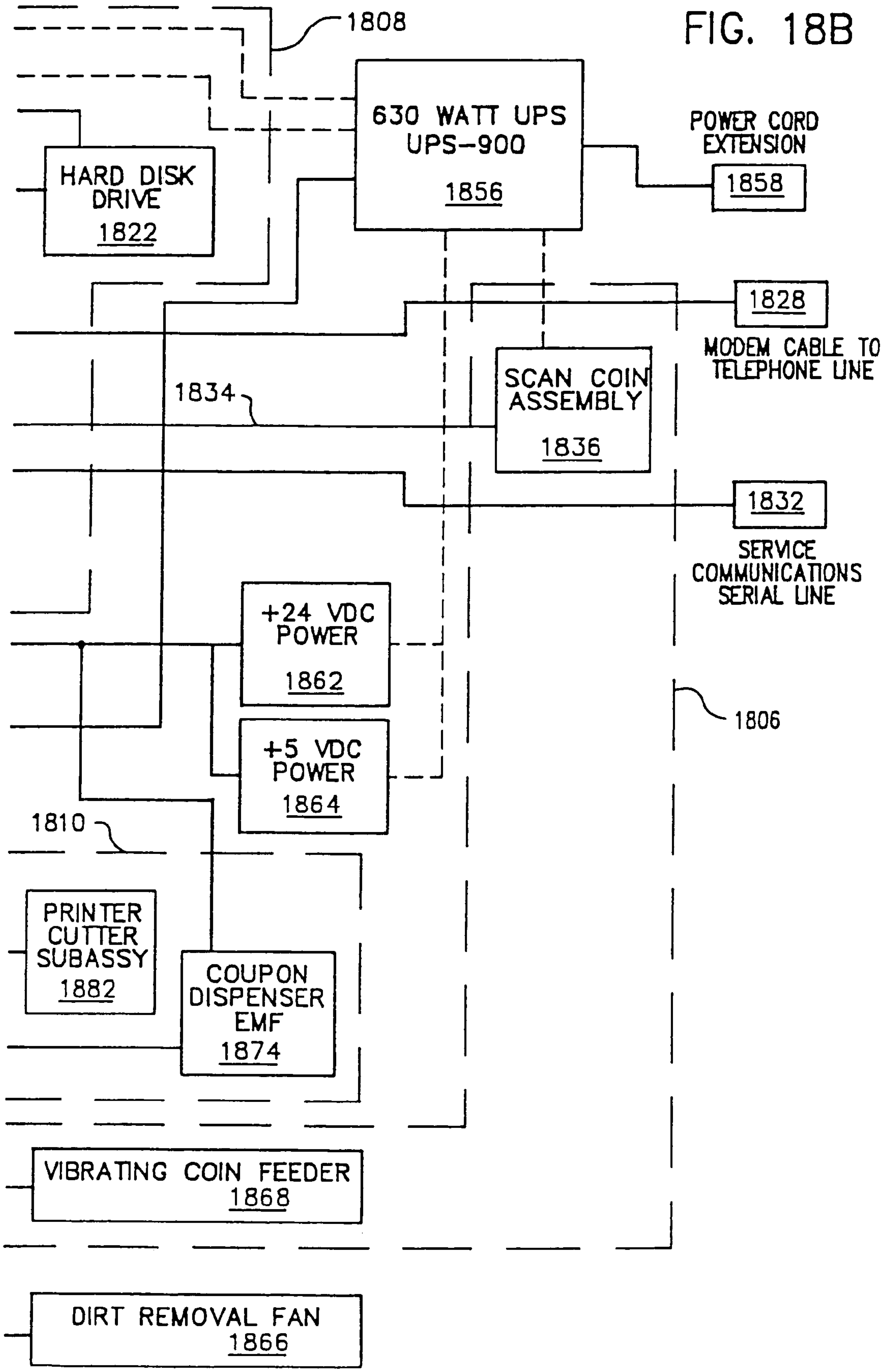

FIG. 18 is a block diagram depicting some of the major components of the control I/O system 1808, the counting/sorting system 1806 and the voucher/coupon system 1810. The central component of the control and I/O system 1808 is a data processing system, preferably, a PC-type system such as 386DX-40 PC system, such as that available from Atronics, as Model ATI-386VL 1812. The data processing system 1812 provides output to a monitor such as a 14 inch SVGA monitor 1814 via an SVGA display board 1816. Audio output can be provided to a speaker 1818 via a sound board 1820 using any of the sound boards available in the art. Mass data storage is provided by a hard disk drive 1822 controlled through a hard disk drive controller 1824. A modem board 1826 is used for providing communication via a modem connected to a telephone line 1828 when desired. Modem communication can be used for uploading or downloading data and/or programs to the data processor 1812. For example, changes in types or values of coupons to be dispensed can be downloaded from a central location. Information regarding the location of products within the store (e.g., for outputting a "shopping list" format coupon or voucher, as described above) can be provided via the modem 1824, 1826.

Communication can also be provided through one or more non-modem communication lines such as the depicted serial communication lines 1832, 1834. In the depicted embodiment, one of the serial communication lines 1834 is connected to the coin counter/sorter 1836 or "scan coin" assembly. This communication line 1834 can be used, for example, to communicate to the data processor 1812 the numbers or value of coins which have been counted or to communicate commands from the data processor 1812 to the sorter/counter 1836 such as commands to commence operation.

Serial communication line 1832 can be used for a number of purposes, such as for providing for service communications. In one embodiment, a serial I/O port is provided to enable connection of the data processor 1812 to another computer such as a laptop or other portable computer. In this way, service personnel can communicate directly with the central data processor 1812, such as for purposes of performing maintenance or diagnostic services, uploading new data or programming, downloading data such as statistical information and the like. In the depicted embodiment, the serial lines 1832, 1834 are controlled through a serial communication board 1838 of a type known in the art. In the depicted embodiment, the serial communication board 1838 also communicates with an input/output (I/O) board 1842. The I/O board 1842 is configured to receive and transmit communications from and to the user or other personnel. In this regard, the I/O board is connected with a key pad, such as a standard 12-key numeric keypad 1844 and one or more key switches 1846, such as key switches for "Go," "Cancel," and the like. In the depicted embodiment, the I/O board 1842 can provide audio output, e.g., via a piezo beeper 1848 and/or an activatable light, such as a light for informing store personnel that service is needed. A reset switch 1852 is provided for issuing a hard reset command to both the data processor 1812 and the I/O board 1842. A PC power supply 1854 receives power from an external power supply such as 630 watt, uninterruptable power supply 1856 and provides conditioned power to the processor 1812 and hard disk drive 1822.

The power supply 1556 preferably provides a source of power directly to the I/O board 1842. Preferably, the data processor 1812 and/or I/O board 1842 include non-volatile memory sufficient to permit orderly shut down of the system in the event of a power failure without loss of vital data or programs. Preferably, the uninterruptable power supply 1556 provides sufficient power to permit orderly shut down and termination of processing in the event of failure of the power source such as interruption of power through the power cord extension 1858. The power supply 1856 also preferably provides power directly to the monitor 1814, counter/sorter 1846, and, via 24 volt and 5 volt power supplies 1862, 1864, to the I/O board 1842.

The I/O board 1842 is used to control portions of the waste control system, such as the dirt removal fan 1866, portions of the counter/sorter mechanism such as a vibrating coin feeder 1868 and a coin accepter or hopper 1872. In the depicted embodiment, the I/O board 1842 controls the coupon dispenser 1872 and, via a voucher printer controller 1874, a voucher paper feed 1878, and a voucher printer/cutter sub-assembly 1882.

FIG. 16 depicts the location of a number of components in the system according to one embodiment. Preferably, when the doors 1622, 1624 are in the open position as shown, most or all of the components are accessible for cleaning and/or maintenance. In the depicted embodiment, the voucher printer 1882 is mounted on the inside of the door 1622. A number of printers can be used for this purpose. In one embodiment, a model LPT 5242-448 printer, available from Seiko is used. The right-hand portion of the cabinet includes the coupon feeder 1874 for dispensing, e.g., preprinted manufacturer coupon sheets through a chute 1626 to the coupon hopper 1222 on the outside portion of the door 1624. The computer 1626, in the depicted embodiment, is positioned at the top of the right hand portion of the cabinet in order to provide a relatively clean, location for the computer. The I/O board is positioned adjacent the sheet feeder 1632.

In operation, the user who wishes only to receive a coupon will indicate such by an input device which can be, e.g., a button, to be pushed by the user. In one embodiment, the user can activate the coupon feeder by inserting a coin into the dummy coin slot 1220 which will be returned via coin return slot 1221. The button or other input device transmits a signal to the processor 1812 indicating that the user has expressed a wish for coupons. In response, the data processor 1812 sends a signal to the coupon dispensing unit 1874 to dispense a predetermined number of sheets of coupons (such as a single sheet) into the hopper 1222. In one embodiment, the microprocessor will stop or delay the dispensing of coupons if more than a predetermined number of requests for coupons have been input during a short period of time. This is to prevent, for example, mischievous depletion of the coupons. In one example, if the microprocessor detects three coupons requests within a predetermined period of time, such as ten seconds, the microprocessor will suspend any dispensing of coupons for a period of time, such as thirty seconds.

Although in the depicted embodiment, the input device for requesting coupons is relatively simply (such as a single request button), it is also possible to provide a more sophisticated interface, such as allowing the user to request specific desired coupons from a menu.

A user who wishes to employ the coin counter/sorter will initially place coins to be sorted into the coin tray 1206. In response to instructions displayed on the screen 1218, the user will then push the start or "Go" button 1215. Preferably, some or all of the buttons activated by the user are "soft" buttons, i.e., in which the location, indicator, legend or other meaning of the activation button is indicated on a changeable video display (such as, for example, an arrow on the display pointing to the button which the user should push to activate the device). Upon receiving an indication that the "Start" button 1212 has been activated, the data processor 1812 outputs a plurality of commands to initiate the counting/sorting operation (some of which are output via the I/O board 1842, as shown in FIG. 18). The commands can include commands to activate the components of the waste control system such as the fan 1866, magnet, etc., to open the gate by activating the solenoid 1436, and/or to activate the vibrating coin feeder 1868. The computer 1812 may also output instructions to the user, such as instructions to lift the handle of the coin tray to initiate the flow of coins. A number of user interfaces can be provided. In one embodiment, the apparatus can receive input indicating whether the user is a novice user or an experienced user of the device. In this way, detailed instructions can be provided to the novice while the experienced user can be provided with a more rapid series of instruction displays. In either case, it is preferred to provide a device which will achieve the desired coin counting with a relatively low total number of button pushes. Preferably, the user need only push a first button to start the counting procedure and a second button to stop the counting procedure. Other interfaces could be used which will automatically detect the insertion of coins into the tray (so as to eliminate the start button requirement) and/or detect the cessation of flow of coins and/or the empty state of the input hopper or tray, so as to eliminate the need for a stop button push.

As the user lifts the tray, coins will pass, with a limited depth, preferably in a single layer, over the peak 1414 and into the transfer tray 1428,1430. While passing over the peak, they will be cleaned by a blowing mechanism as described above. Passing down the transfer tray they will pass by the magnet, as described above, to separate for example, magnetic bus tokens and the like from coins. Foreign material and liquids will either be blown off the coins and out of the machine or will fall through the perforations and into the dirt tray. The coins passing down the transfer tray will pass into the coin hopper 1634 for movement, by a vibrating coin feeder connected to the output of the hopper, to the counter/sorter mechanism 1212. The counter/sorter mechanism counts the coins and a running total is stored in memory, either in the counter/sorter mechanism 1212 or the control I/O mechanism 1308. Preferably, the computer 1812 presents a running total of the value of the coins on the screen 1218 during the counting process. After being counted, they are sorted according to denomination and placed in coin bags 1608, also according to denominations. The counting/sorting mechanism 1306 informs the computer 1812 when coins are no longer input into the mechanism. After a predetermined amount of time has passed following cessation of coin flow, such as about 10 seconds, the computer 1812 will cause the screen 1218 to display a message to the user asking whether the user has input all desired coins. Once the user has verified that all desired coins have been input, the computer 1812 controls the voucher/coupon system 1310 to output a voucher in an amount related to the value of the coins which were counted, preferably an amount at least equal to the value of the coins that have been counted. In one embodiment, the computer 1812 also causes one or more coupons to be dispensed 1874 so that the user can receive both a voucher in the value related to the value of the coins and one or more coupons.

Figure 19:
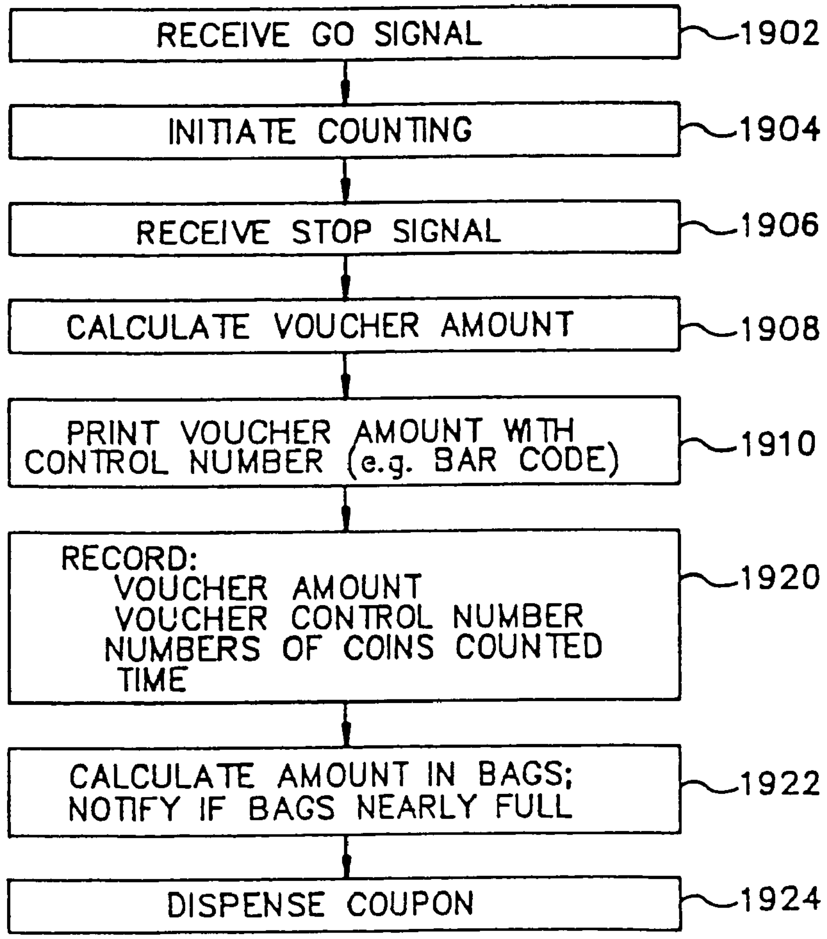
FIG. 19 is a flow diagram depicting a procedure for counting and recording results, according to an embodiment of the present invention.

FIG. 19 depicts the procedure for counting coins which also includes recording certain pertinent information. Preferably, the information is recorded by the computer on non-volatile media so that the information is not lost upon a power loss or a power-down. As described above, after a "begin" or "go" signal is received 1902 the device initiates the counting 1904 until such point as the stop signal is received 1906, generally as described above. After the coins have been received and counted, the voucher amount is calculated 1908. In one embodiment, the voucher amount is related to the total counted amount by being equal to the total amount less a transaction fee. In one embodiment, the transaction fee depends upon the numbers of various dominations, for example, the fee might by ten cents for each dollar of pennies counted and five cents for each dollar of other dominations counted. In another embodiment, the voucher amount is related to the total amount by being equal of the total amount. In still another embodiment, the voucher amount is related to the total amount by exceeding the total amount, e.g., to provide a premium for using the counting device.

After the voucher amount is calculated the voucher is printed 1910. Preferably, the voucher includes a number of items of information in addition to the amount of the voucher. These additional items of information can include one or more of the location or other identifier of the machine at which the counting was done, the location or other identifier of the store or other place where the voucher may be exchanged for cash or merchandise, the time and date of the transaction, the total amount counted, the number coins of each denomination counted, the number of rejected coins or other items, and a transaction control number. Preferably, the control number is unique, at least to the particular location and date or time. In one embodiment, the voucher is printed with a scannable code such as a bar code. This permits easy exchange of the voucher, e.g., by scanning the bar code e.g., at a grocery or other retail check out stand in the same way universal product code (UPC) bars codes are scanned.

The apparatus records, preferably using a computer and recording onto a non-volatile media, information regarding the transaction. In one embodiment, the information which is recorded includes the information noted above that can be included on the voucher, such as the voucher amount, a control number, numbers of coins counted and time of transaction 1920. Preferably, the apparatus also determines the amount that has been deposited in the various coin bags. This permits the apparatus to output a signal or notification when the bag capacity is nearly full, to enable armored car personnel or other personnel to retrieve the full bags and replace those with empty bags 1922 as described more fully below. As noted above, the apparatus, in one embodiment, will also automatically dispense one or more coupons 1924 at the conclusion of a counting transaction.

The printing of various information on the voucher 1910 and the recording of various information about the transaction 1920 serve a number of useful functions. Providing information on the voucher gives the user an extra opportunity to verify accuracy and/or acceptability of the count and, potentially, detect any malfunctions that may have occurred. The information is also useful to store personnel in verifying accuracy and authenticity of the voucher. Store personnel may be able to detect an inaccurate or unauthentic voucher if, for example, the voucher indicates a transaction time during which the store was not open, or indicates similar inconsistencies. Furthermore, store personnel can, if suspicious, check the information printed on the voucher against the information recorded in the device (as described more fully below) to further check authenticity.

The recording of information 1920 is useful for a number of reasons. First, the information is useful in facilitating the removal of coin bags for deposit, e.g., in a bank, as described more fully below. The information is useful to store personnel in verifying particular transactions or detecting malfunctions. The information is useful to the counting machine operating company to verify amounts counted and amounts deposited in the bank and to help determine the source of errors if there is a discrepancy between amounts removed from machine and amounts deposited in the bank. For example, the recorded information is useful to both the operating company and the store personnel to diagnose malfunctions or to become aware of servicing or maintenance needs of the apparatus.

Figure 20:
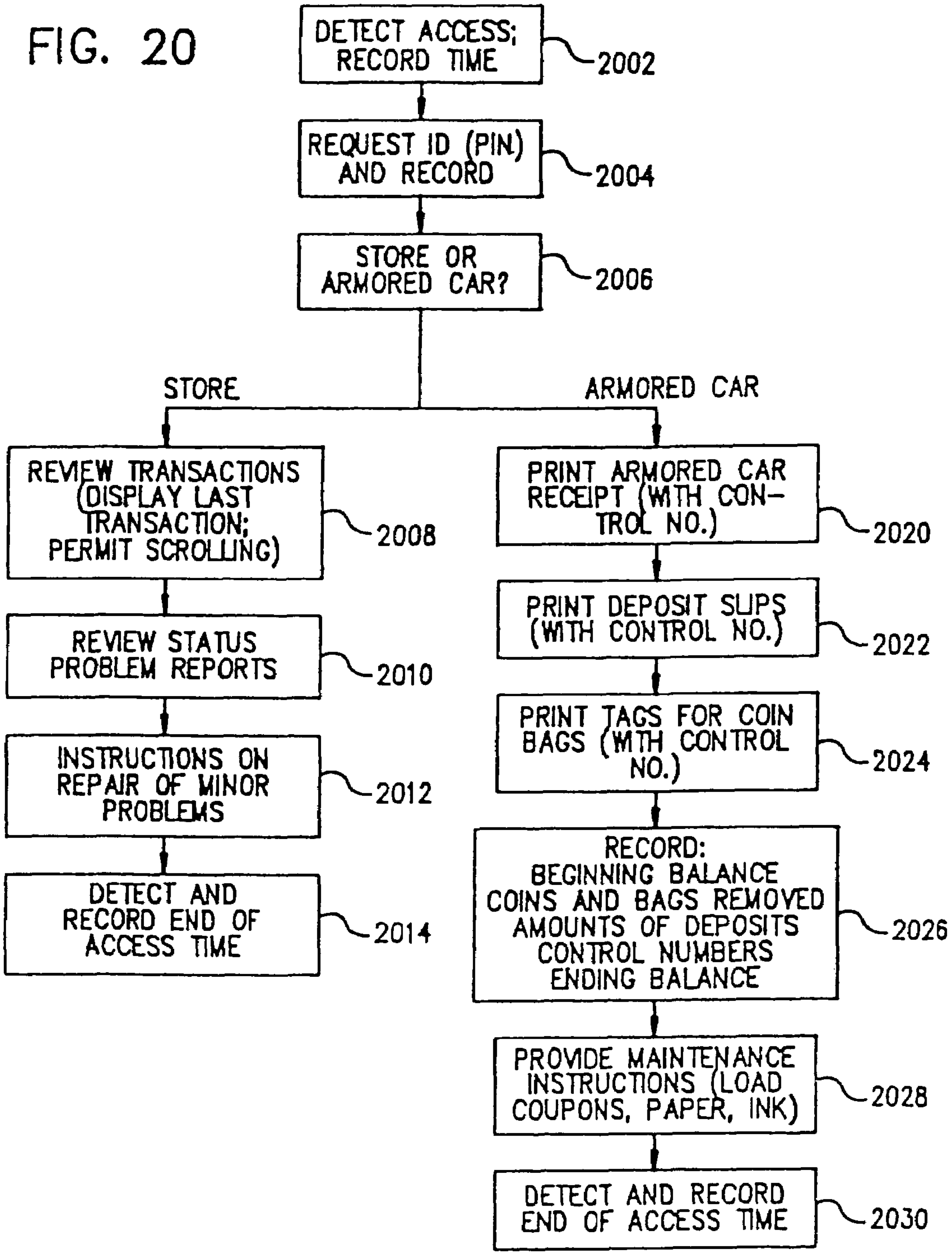
FIG. 20 is a flow diagram depicting procedures for obtaining and recording access according to an embodiment of the present invention.

FIG. 20 depicts a procedure for permitting, facilitating and recording information relating to access of the machine, i.e., access to features or components of the machine other than those for normal counting, voucher and coupon dispensing, used by an ordinary user. The depicted embodiment records information relating to armored car (or other monetary transfer services) access and store (or other remote location facilities) access. Other types of access could include service, repair or maintenance access, such as by an independent service or maintenance contractor and/or access by the counter apparatus operating company.

In the depicted embodiment, the machine can detect an access, or attempted access and will record the time of this event 2002. In one embodiment, the apparatus includes a key switch which, by inserting and turning the key, can change the machine from a run mode to a store access mode and/or an armored car access mode. Preferably, the keyswitch is configured to provide a signal to the microprocessor upon changing the mode to permit the apparatus to detect the access or attempted access and to record the time of the event.

After the attempted access is detected (such as by the turning of a keyswitch) the apparatus is preferably configured to receive an authenticating input such as a personnel identification number (PIN), preferably in response to a prompt output by the device, and the identification is then recorded 2004. The procedure followed thereafter depends upon whether the access is by store personnel or armored car personnel 2006.

In one embodiment, the types of access and information available to store personnel are limited. For example, the store personnel may be permitted to review information relating to the various transactions that have occurred in the counting device 2008. The device may display the most recent transaction and may print receipt of a command (e.g., through a key board) to scroll to previous or later transactions. In some embodiments, the store personnel now may be permitted to review status information (e.g., total amounts counted, amounts removed by armored car carriers, amount of coupons in the device, full/empty status of coin bags, etc.) or may be permitted to review problem reports (jams, paper or coupon misfeeds, power outages and the like 2010).

In one embodiment, the device can output (either in run mode or in store access mode) instructions regarding how to repair minor problems or service or maintain the device, such as instructions clearing a jam, replenishing the supply of coupons, paper, ink and the like 2012.

After the store personnel has finished the store access procedures desired, the store personnel will return the machine to "run" mode and the machine will detect and record the end of access by store personnel 2014.

In cases in which the accesses is by an armored car personnel, typically for the purpose of retrieving coin bags, e.g., for deposit in a bank, several items will be printed by the machine. Preferably, the printing will be performed by the same printer used for printing vouchers, and will be under the control of the microprocessor. One item which may be printed is a receipt for the armored car personnel which memorializes the amount of money which the armored car personnel is retrieving from the device 2020. Preferably, the receipt will be also imprinted with a control number.

Preferably, the machine will also print bank deposit slips for use when the retrieved money is deposited into the bank 2022. In one embodiment, the money will be deposited in two or more accounts. For example, in one embodiment the transaction fee (described above in connection with FIG. 19) is deposited into the account of the owner/operator of the counting machine while the remaining funds are deposited into the account of the retail store or other location where the voucher is exchanged. Other embodiments may also be possible. For example, in one embodiment the counting apparatus owner/operator may charge a service fee to the store or retail outlet over and above any transaction fee which will thus affect the amounts of the respective deposit slips. Alternatively, the counting apparatus owner/operator may wish to receive an amount which is less than the transaction fee (if any) charged to the user, thus effectively splitting the transaction fee between the counting apparatus owner/operator and the store. In another embodiment, it may be that there is no transaction fee obtained from the user and, instead, the machine owner/operator may charge a fee directly to the store. These and other variations and alternatives can be reflected in the amounts calculated for the various deposit slips 2022. Preferably, the deposit slips will also be imprinted with a control number for later verification.

In one embodiment, the apparatus will also print tags 2024 to be attached to the various coin bags that are being removed. The tags will preferably indicate the denomination of coins in each bag and the number of coins of that denomination. Preferably, the coin bag tags will also be imprinted with a control number. In one embodiment, the same control number is used for all of the printed items 2020, 2022, 2024. The printed items 2020, 2022, 2024 may also contain other information such as store location, machine identifier number, time and date and the like.

Preferably, the apparatus will record pertinent information, such as by using the computer to record information on non-volatile media. The information recorded can include one or more of the beginning balance, the number and types of coin bags removed, the denomination and number of coins in each bag removed, the amounts of the respective deposits, the control number or numbers and the ending balance 2026.

In one embodiment, armored car personnel are also used to provided service and/or maintenance to the machine. In one embodiment, the machine can provide requests or instructions for providing such service, such as by requesting or instructing the armored car personnel to load additional or new coupons, to replenish the supply of paper, ink and the like 2028. After the armored car personnel have finished their tasks, they will close the machine and return the machine to run mode. At this point, the machine will detect that the armored car access has ended and will record the ending time of the armored car access 2030.

In addition to accessing information by obtaining it directly at the site of the counting machine, the apparatus is also configured for providing information from the field location of the machine (or “remote location”) to, for example, a central location such as offices of the owner/operator of the machine. Remote access can also be performed in connection with other entities such as a bank or an accounting firm. In one embodiment, the communication can be performed using a communication device such as modem board 1826. Communication can also be performed over a local area network system, over a wireless communication system (such as a wireless LAN or a cellular telephone communication system, or by a cable communication such as an interactive television or video communication system.

Figure 21:
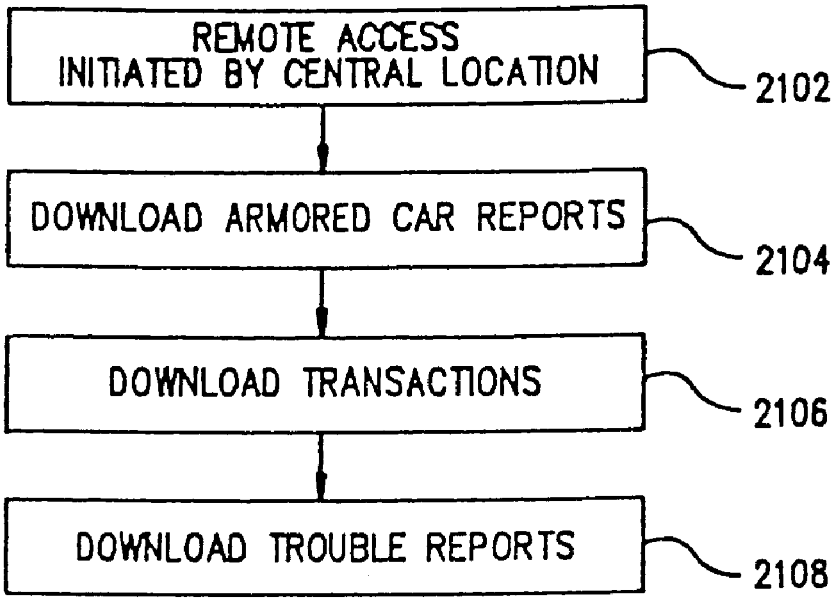
FIG. 21 is a flow diagram depicting a procedure for remote access initiated by a central location.

FIG. 21 depicts a procedure in which remote access is initiated by the central location 2102. For example, the central location may initiate access to one or more of the various remote sites in order to obtain information, e.g., as needed for accounting, maintenance and the like. In the embodiment of FIG. 21, the central location can instruct the remote site to download information relating to armored car transactions 2104, typically comprising the information that was recorded in connection with an armored car access, as described above in connection with FIG. 20. The central location can instruct the remote location to download information regarding the various transactions that have occurred, e.g., over a predetermined period of time 2106. The transaction information can include, for example, the information recorded in connection with transactions, as described above in connection with FIG. 19. The central location can instruct the remote location to download information relating to service or maintenance status or problems 2108. For example, the downloaded service or trouble reports can include information about the times and nature of various malfunctions such as, jamming, misfeeds and the like. The downloaded information can include information about the status of items which may need attention such as loading of additional or new coupons, loading of tape, ink and the like, or notification of required periodic maintenance such as cleaning, battery or other component replacement and the like.

Figure 22:
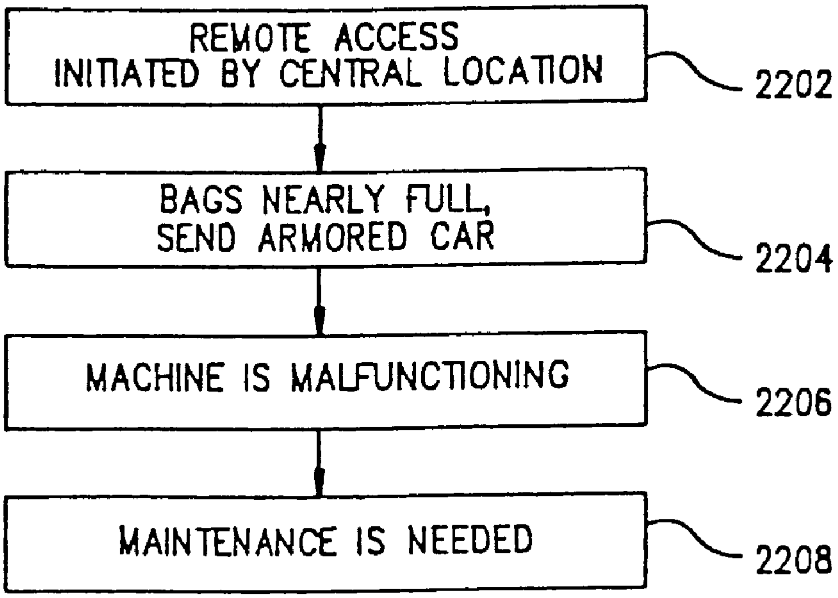
FIG. 22 is a flow diagram depicting procedures for remote access initiated by the remote location.
Figure 23:
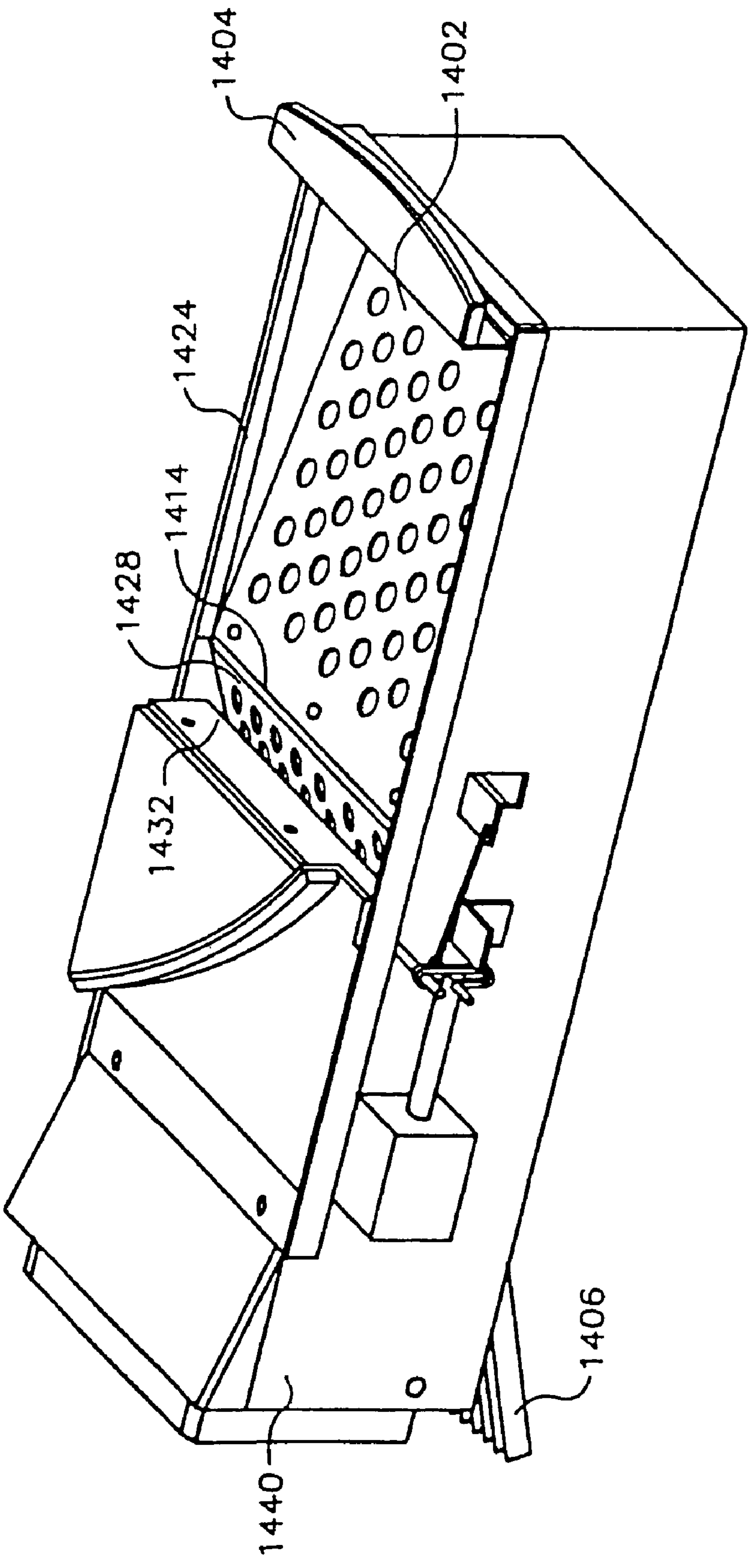
FIG. 23 is a perspective view of the input tray, peak and initial portion of transfer tray, according to an embodiment of the present invention.

FIG. 22 depicts a remote access that may be initiated by the remote location 2202. For example, the remote location may initiate a call to the central location in a situation in which the coin bags are nearly full, thus informing the central location that it is necessary to dispatch an armored car to service the remote location 2204. The remote location may initiate a call in order to inform the central location of a malfunction 2206. Preferably, several levels of malfunction can be detected by the device. As noted above, in some embodiments, the machine may be capable of clearing some types of coin jams without intervention of either store personnel or central location (service) personnel. In some cases, the machine may detect a malfunction which is not of the type which can be automatically cleared or may have attempted to automatically clear a malfunction, without success. In this case, the machine may, in some instances, attempt to notify store personnel of the situation and/or may attempt to notify store personnel of procedures to be followed in order to correct the situation. Such a notification could include sending a signal to the store central computer, illuminating a “trouble” light or other indicator, displaying a message on the video screen, or the like.

In some cases the machine may experience a malfunction which it determines can not be or was not cleared automatically and which can not be or was not corrected by store personnel. In this case, the device may initiate access to the central location to report such a malfunction, thus permitting the central location to dispatch service personnel to correct the situation.

The remote device may initiate a call to the central location in order to inform the central location that maintenance needs to be performed, such as loading additional or new coupons, loading papertape, ink and the like 2208.

Figure 1:
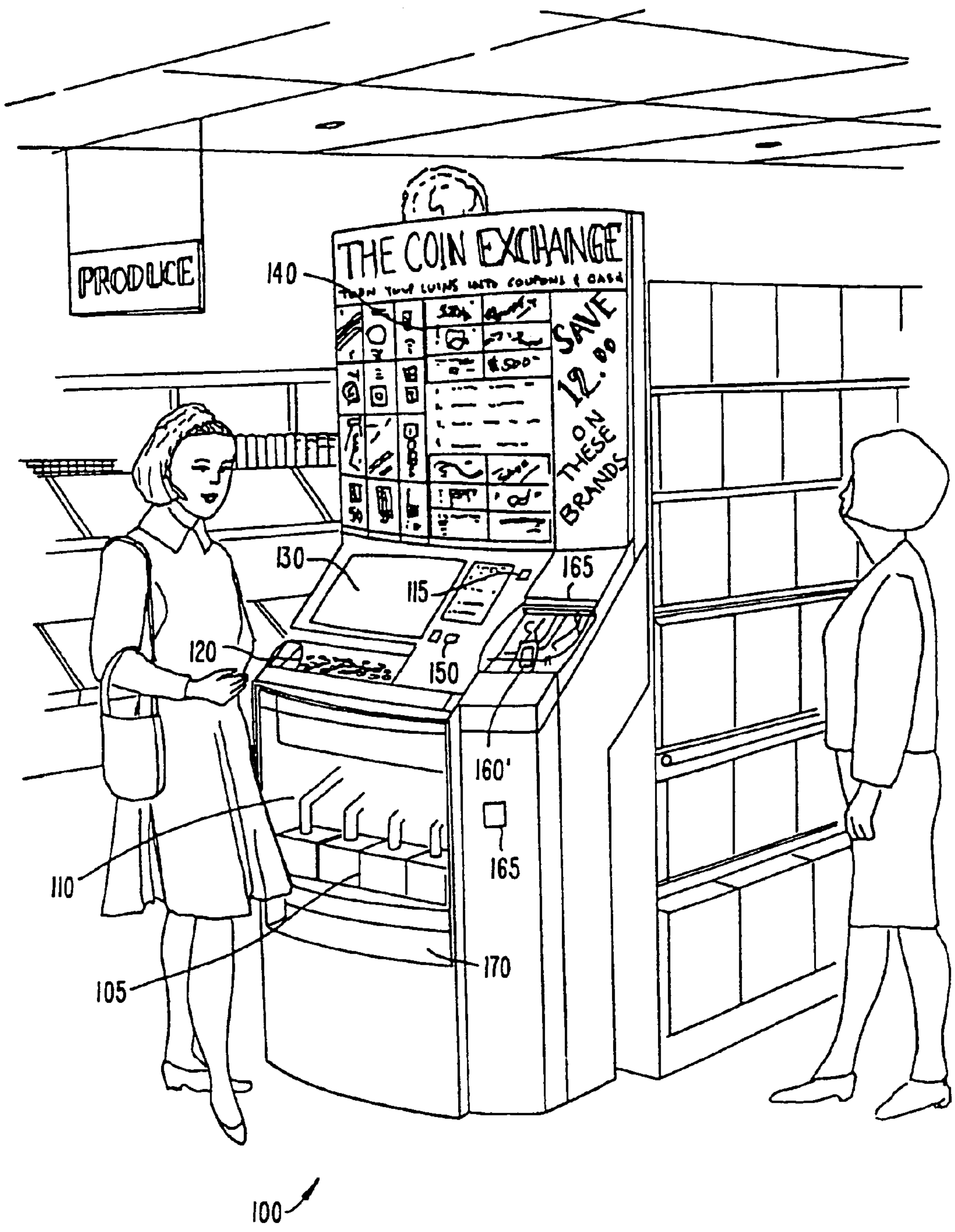
FIG. 1 is an illustration of an embodiment of the coin exchange apparatus in a likely environment.

FIGS. 1-11 depict a second embodiment of a coin exchange kiosk 100 in a possible environment; a supermarket. The embodiment of FIGS. 1-11 shares many features with the embodiment of FIGS. 12-18 and descriptions of such common features below apply to corresponding features of the embodiments of FIGS. 12-18. In FIG. 1, kiosk 100 is free-standing, and has been designed with a small footprint to reduce or minimize the required floor space. The lower front surface 110 is clear, allowing the user to watch the coins as they are separated, counted, and dropped into escrow tray 105. By making the process visible to the user, trust in the machine is encouraged. Furthermore, since watching the sorting process is interesting, the user becomes integrated into the machine's operation and is further encouraged to use the machine.

Initially the coins are placed in coin tray 120 where small foreign objects fall through perforations in the bottom of the tray and the user can remove large foreign materials prior to coin sorting. When the user is ready to begin the sorting process, they must push "go" button 115. Button 115 initializes the coin counter, activates the coin sorter, and activates the fan within the waste management chute. If the system does not detect coins within a predetermined period of time, both the coin sorter and the fan are deactivated. The user next raises the edge of tray 120. The tray is hinged on the right side and acts as a chute to funnel the coins into the kiosk. User directions, transaction information, store bargains, and advertisements appear on video screen 130. Screen 130 can also be used to show attention getting displays in order to attract potential users. Once the coins are admitted into the kiosk and the go button has been pushed, the waste removal and coin sorting process begins. During the coin sorting process, coins which do not meet predetermined physical criteria are rejected and returned to the user via chute 165. In one embodiment, as the coins are counted the video screen displays both the total monetary value and the number of coins collected within each denomination.

At the conclusion of the sorting process, the user is asked to either accept the stated coin value and continue the transaction, or cancel the transaction. This selection is made by pushing one of two buttons 150. If the user continues the transaction, then the coins in the escrow tray 105 are dumped into a depository and the user is issued a voucher through slot 160. In one embodiment, the voucher is worth the value of the counted coins and is redeemable at the retailer's cashier for cash or credit towards purchases. Store coupons, printed by the voucher printer and good towards store bargains, are dispensed with the cash voucher. Manufacturers' coupons are dispensed through an adjoining slot 165 at no cost to the user. If the user cancels the transaction the coins are returned in area 170. The upper back portion 140 of kiosk 100 is a display board where advertisements and notices can be placed. Display board 140 can also be used to indicate what coupons the machine is currently dispensing.

Figure 2:
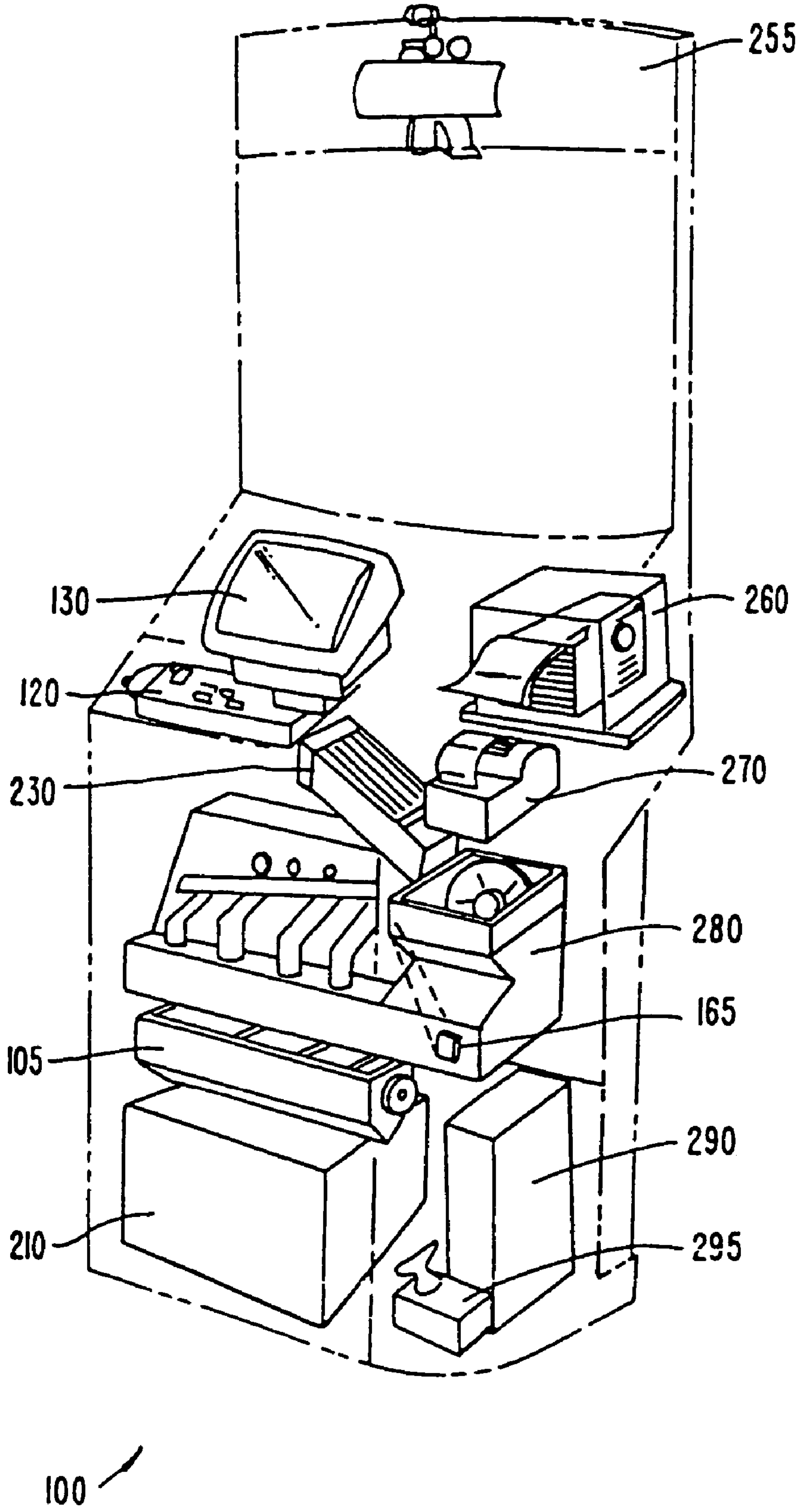
FIG. 2 is a diagram showing the internal layout of the principal components in one embodiment of the present invention.

The internal layout of kiosk 100 is shown in FIG. 2. The coin storage area 210 holds the coins after the transaction has been completed. Area 210 can either be separated into large capacity bins to hold each denomination, or into ready to use coin trays. When the storage area is close to capacity, an indicator 255 on the outside of the kiosk 100 notifies store personnel to empty the storage area 210.

The outside of the waste management system 230 is visible in this diagram. Liquids fall through the porous, grooved bottom plate of system 230 while lint and other fine materials are blown away by a small fan located in the chute. Liquids are collected in a waste receptacle. At the end of system 230, the coins are funneled into the coin counter and sorter 280. This is a commercially available sorter. Several manufacturers make suitable machines, although in one embodiment a Scan Coin Model 109 with a modified hopper is used. The counter accepts mixed coins and is able to detect foreign coins and slugs. Rejected coins are returned to the user through chute 165.

In one embodiment of the kiosk, two different printers are used. Printer 270 is used to print the cash vouchers and the store coupons. Printer 270 can be, e.g., an Epson TM267 printer. Besides containing the amount of the voucher, the voucher will also contain other information such as store name, transaction number, bar codes, etc in order to make counterfeiting difficult. Special papers and inks can also be used to discourage counterfeiting. In one embodiment, a separate printer 295 makes a continuous record of each transaction. This printer is an Epson RP265. In a second embodiment printer 270 serves a double function. Besides printing the vouchers, upon command by store personnel this printer prints out all of the pertinent transactional information. CPU 290 also stores this information.

In one embodiment, VGA screen 250 is a Super VGA monitor; CPU 290 is a Belmont, 386, 40 MHz CPU; and high capacity sheet feeder 260 is a modified 1000 sheet feeder manufactured by Gradco, model number HCF-1000.

Warning light 255 warns store personnel when either printer is low on paper, the sheet feeder is low on paper, or there has been a system malfunction.

Figure 3:
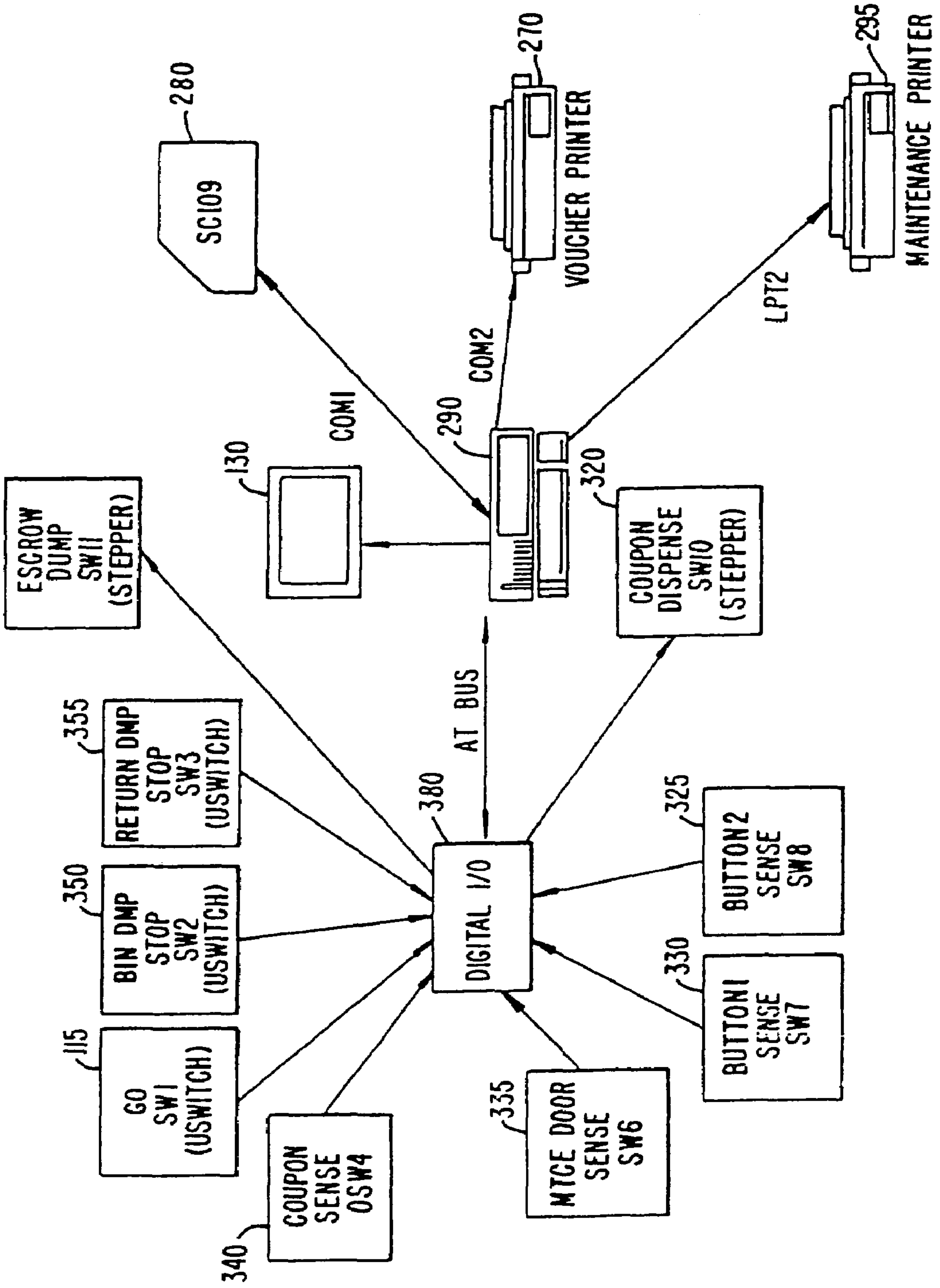
FIG. 3 is a block diagram of the system level electronic functions.

FIG. 3 is a block diagram of the system level electronic functions. The entire system is controlled by CPU 290. System information is presented on display 130 which is the same monitor used to communicate with the user. System inputs are coupled to CPU 290 via data bus 380. Push button switches 330 and 325 are used by the user to either accept or cancel the transaction. Switch 335 is a maintenance switch which is used by store personnel to command the system to download system information to either the maintenance printer 295 or to a floppy disk. The maintenance switch may also be used to enter a mode to allow clearing of coin jams and an internal store coin counting mode. This internal store coin counting mode will enable the retailer to sort and count coins from vending machines and cash registers, bypassing the voucher and coupon functions. Leading edge sensor 340 tells the system each time a sheet of coupons has been dispensed. Stepping motor 320 dispenses the coupon sheets. Push button switch 115 is depressed by the user to initialize the counting system and activate both the coin counter/sorter 280 and the waste management fan. Microswitches 350 and 355 deactivate escrow tray stepping motor 360, thus preventing possible mechanical damage by the stepping motor moving the tray past its designated limits, and indicate to CPU 290 the position of the escrow tray (i.e., at-rest position, returning coins to the user position, or dumping coins into the machine's storage area position). CPU 290 also controls the voucher printer 270.

Figure 4:
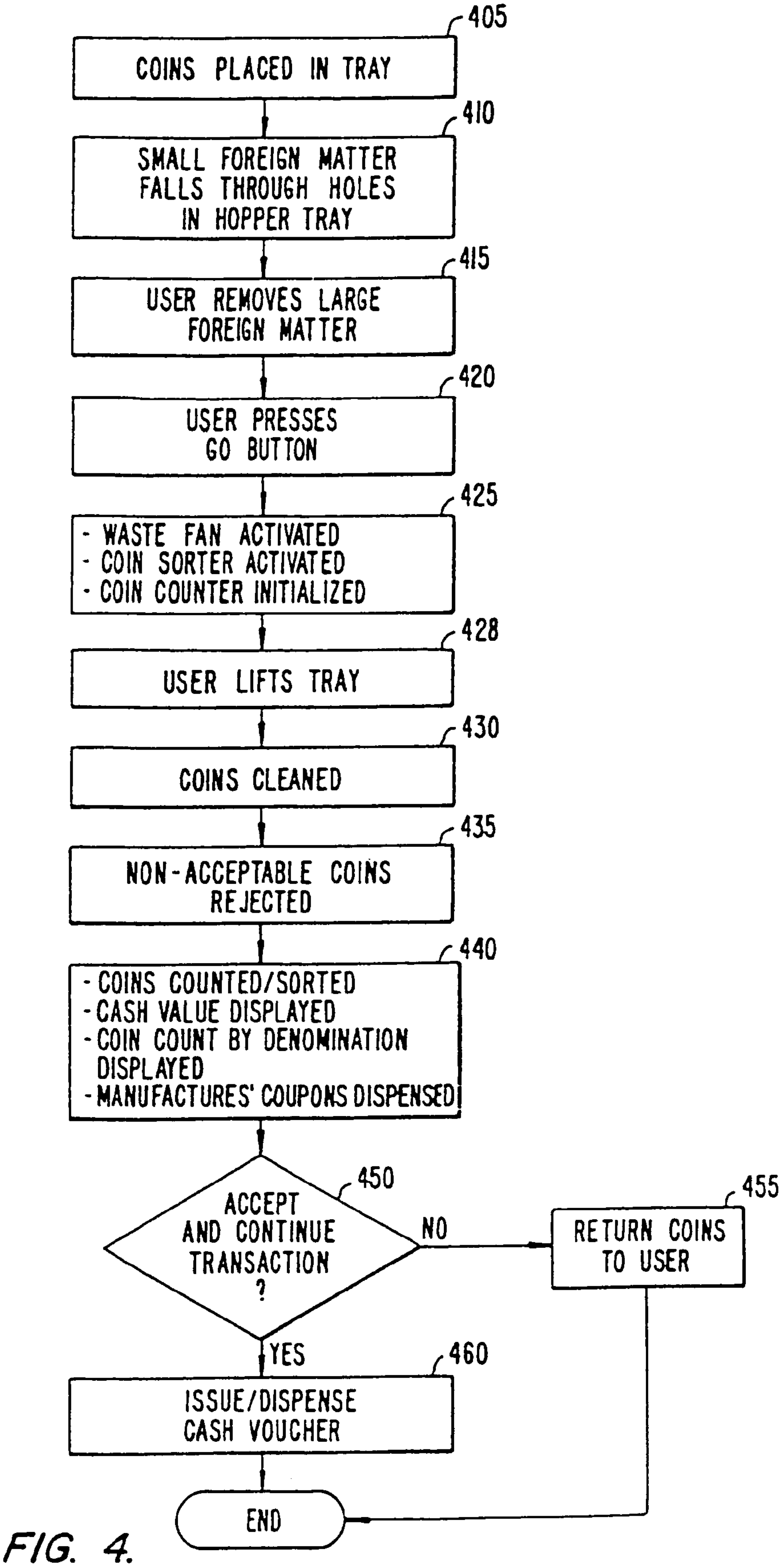
FIG. 4 is a flow chart of the operation of the system.

The flow chart of FIG. 4 illustrates the operation of the coin exchange kiosk according to one embodiment of the invention. The user places coins of varying denominations into the external tray (step 405). Small foreign matter falls through perforations in the bottom of the hopper tray (step 410) while large foreign matter is removed by the user (step 415). When the user is ready to begin using the machine, they press the "go" button (step 420). Pressing the go button activates the coin sorter, initializes the coin counter, and activates the fan within the waste management chute (step 425). Next the user lifts the edge of the hopper tray, dumping the coins down the entrance chute of the waste management system (step 428). As the coins go through the waste management system certain waste, such as liquids, are removed (step 430). The coins are then counted and sorted (step 440). During this step coins which do not meet predetermined physical criteria are rejected and returned to the user (step 435). As the coins are counted, the value of the coins is displayed on the monitor as well as the number of coins counted within each denomination (step 440). Manufacturers' coupons are dispensed at this time (step 440). After all of the coins are counted, the user is asked to either accept the value that has been determined and continue the transaction or to reject the value and discontinue the transaction (step 450). If the user decides to reject the stated value then the coins are returned (step 455). If the user decides to accept the stated value and continue the transaction then a cash voucher is dispensed for the stated value (step 460).

Figure 5:
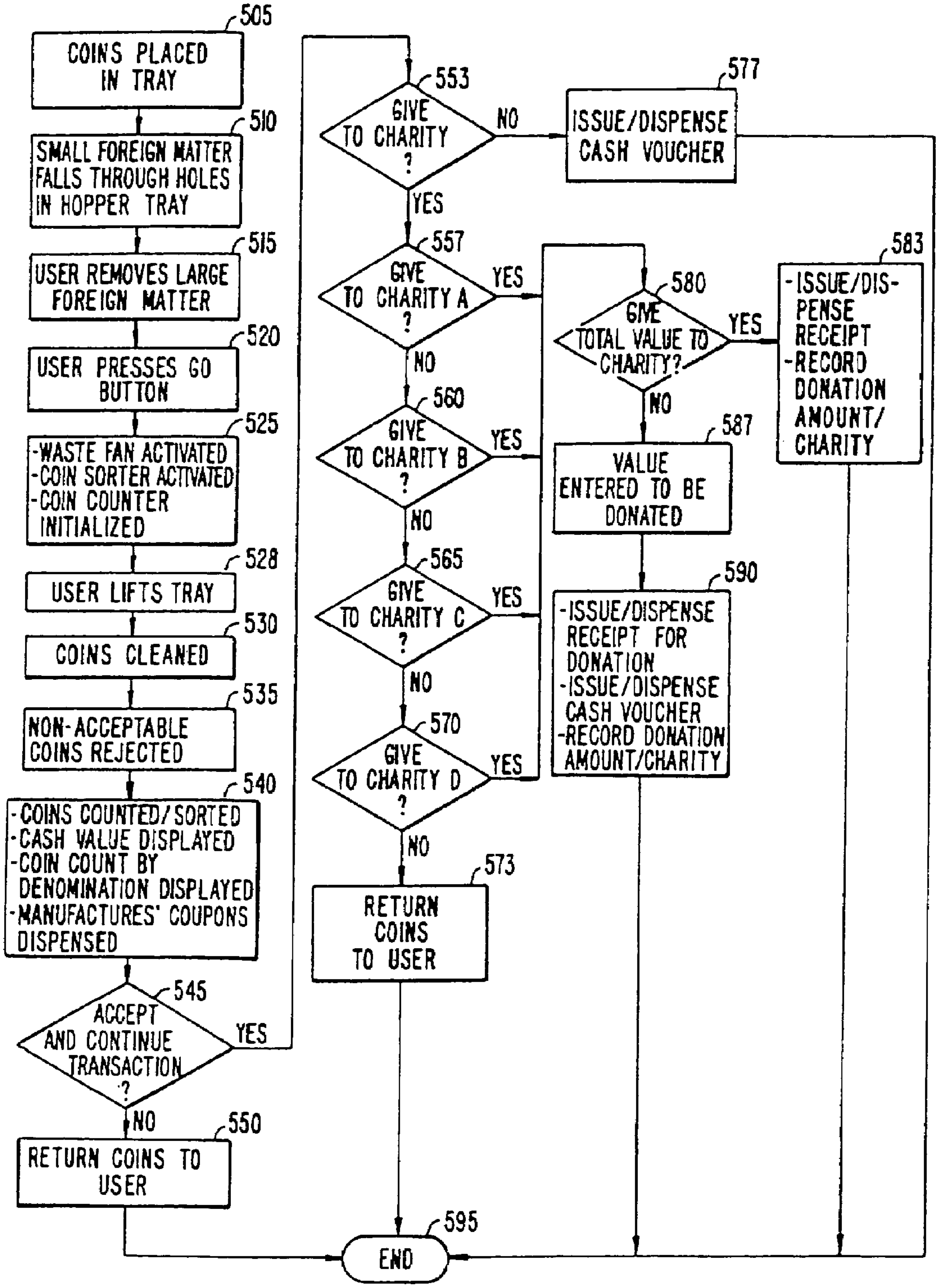
FIG. 5 is a flow chart of the operation of a second embodiment of the system.

The flow chart of FIG. 5 illustrates the operation of the coin exchange kiosk in a second embodiment. The user places coins of varying denominations into the external tray (step 505). Small foreign matter falls through perforations in the bottom of the hopper tray (step 510) while large foreign matter is removed by the user (step 515). When the user is ready to begin using the machine, they press the "go" button (step 520). Pressing the go button activates the coin sorter, initializes the coin counter, and activates the fan within the waste management chute (step 525). Next the user lifts the edge of the hopper tray, dumping the coins down the entrance chute of the waste management system (step 528). As the coins go through the waste management system certain waste, such as liquids, are removed (step 530). The coins are then counted and sorted (step 540). During this step coins which do not meet the predetermined physical criteria are rejected and returned to the user (step 535). As the coins are counted, the value of the coins is displayed on the monitor as well as the number of coins counted within each denomination (step 540). Manufacturers' coupons are dispensed at this time (step 540). After all of the coins are counted, the user is asked to either accept the value that has been determined and continue the transaction or to reject the value and discontinue the transaction (step 545). If the user decides to reject the stated value then the coins are returned (step 550) and the transaction ends (step 595).

If the user decides to accept the stated value and continue the transaction then they are asked whether they would like to donate, in whole or in part, the value of the coins to a charity (step 553). If the user does not wish to donate to a charity then a cash voucher is issued (step 577) and the transaction ends (step 595). If the user wishes to donate to a charity, then the user is asked to chose to which charity they wish to donate (steps 557, 560, 565, and 570). If they do not wish to donate to any of the listed charities, then the transaction ends (step 595) and the coins are returned (step 573).

After choosing to which charity they wish to donate, the user is asked if they wish to donate the total value of the coins (step 580). If the user wishes to donate the total amount then a receipt is issued which states the amount and the charity (step 583). CPU 290 records the amount donated and the charity (step 583) so that when the coins are removed from kiosk 100 the proper amounts can be deposited to the appropriate charity organizations. If the user selects to donate only a portion of the total amount, they then enter the amount to be donated (step 587). At this point a receipt for the donated portion is issued, a cash voucher for the remainder of the total amount is issued, and CPU 290 records the amount donated and the charity for later disbursement of funds (step 590).

Figure 6:
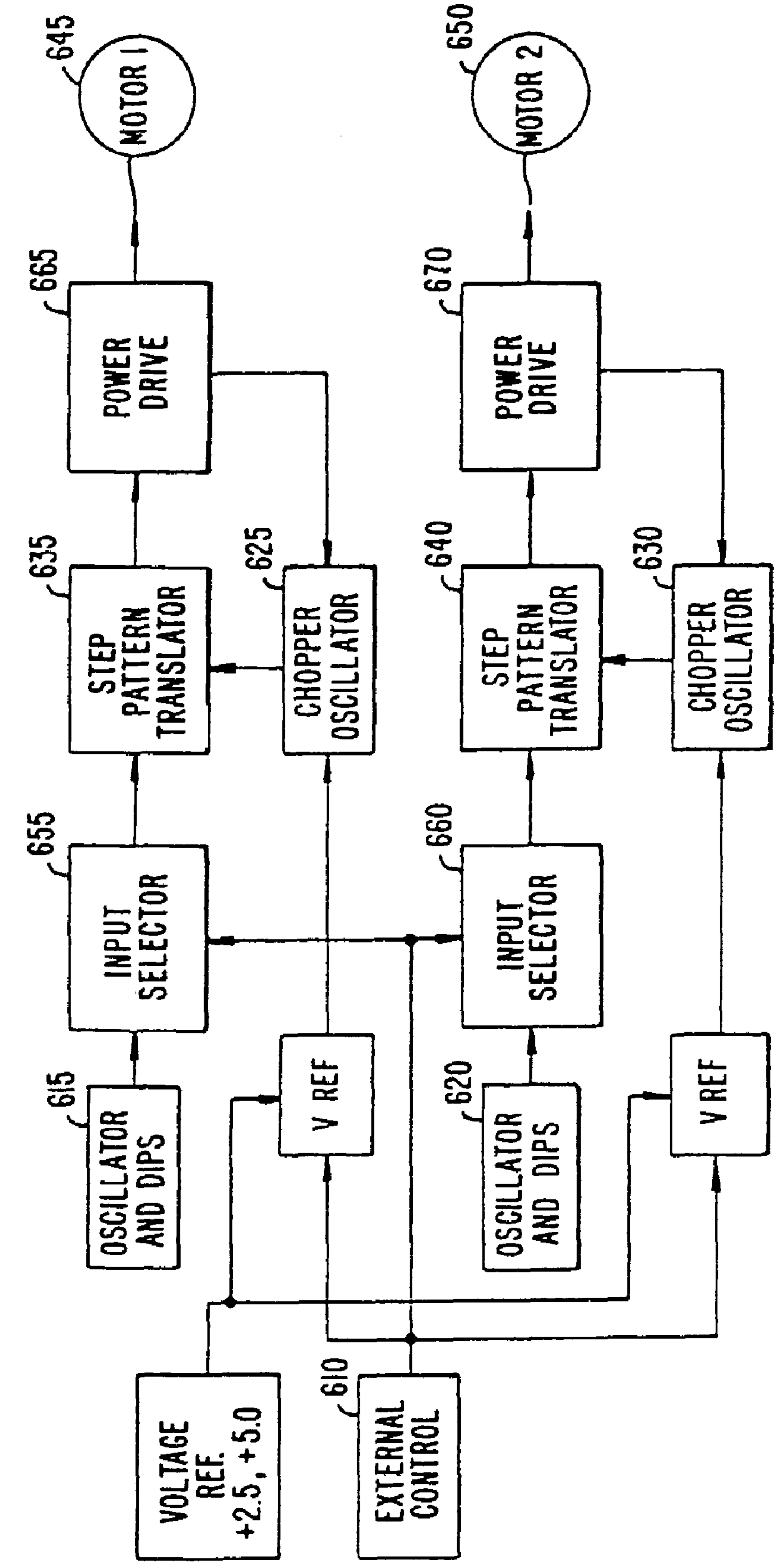
FIG. 6 is a block diagram of the stepping motor control circuitry.

FIG. 6 is a block diagram of the stepping motor control circuitry for the two stepping motors used in kiosk 100. One stepping motor controls the coupon dispenser and the other stepping motor controls the escrow tray. The circuitry for the two motors are duplicates of one another. The oscillators in blocks 615 and 620 generate the pulses which set the stepping motor rates. The dip switches in blocks 615 and 620 allow manual setting of the oscillator rates. Each motor has a second oscillator, blocks 625 and 630, which set the chopping rate. The step pattern translators, blocks 635 and 640, use both oscillators to generate the step motor patterns. Two different oscillators are used in order to maximize the power efficiency.

In operation, computer 290 determines when power should be supplied to either the coupon dispenser stepping motor 645 or the escrow tray stepping motor 650. This input is supplied via interface 610. This signal is received by either input selector 655 or 660. In one embodiment, this signal is digital. Depending upon the signal, the selector determines the length of time the stepping motor will be operated. For example, one signal from interface 610 will cause the coupon dispenser (motor 645) to dispense only a single sheet of coupons while a different signal will cause two sheets of coupons to be dispensed. Similarly, one signal from interface 610 will cause the escrow tray (motor 650) to rotate in one direction thereby returning coins to the user, while a different signal will cause the opposite motor rotation thereby depositing the coins into the coin receptacle. The power drive units 665 and 670 supply, upon command, sufficient power to operate stepping motors 645 and 650.

FIG. 7 is a side view of coin tray 120 and waste management chute 230. Coin tray 120 normally is flush with the top surface of kiosk 100 (Position 710). The user places their coins in the tray and at this point removes any obvious foreign materials. When the user is ready to begin the sorting process, they lift handle 715 on coin tray 120. The tray is hinged at point 730. When tray 120 is in position 720, the coins fall through waste management chute 230. The coins leave chute 230 through opening 740 to enter the coin sorting and counting mechanism. Liquids accidently dropped into the coin hopper are funneled through spout 750 to a suitable collection receptacle.

FIG. 8A is a diagram of the bottom plate of waste management system 230. FIG. 8B is an enlarged view of a small section of this plate. The surface of the plate has grooves running lengthwise, these grooves forming a series of alternating peaks 810 and valleys 820. The coins ride along the surface of the plate while liquids flow down the valleys 820, eventually flowing through perforations 830 drilled in the bottom of the valleys 820. The liquids are then funneled down spout 750, and collected. The sharp peaks 810, combined with a teflon coating, help minimize the friction caused by the liquids which may accompany the coins. This in turn helps prevent a slow down of the sorting process.

Figure 9:
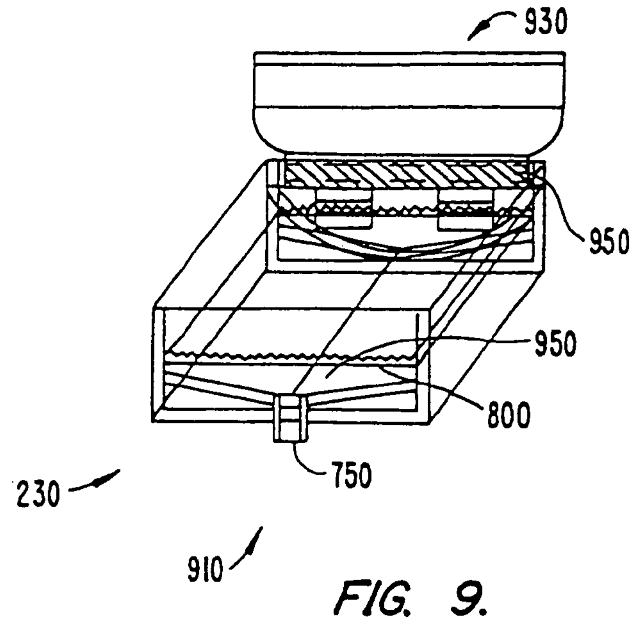
FIG. 9 is a three-dimensional view of the waste management system.

FIG. 9 is a three dimensional view of the waste management chute 230. The coins enter and travel down the chute in direction 930. As the coins travel down this chute, a fan (not shown) blows air back up the chute in direction 910.

Light materials, such as small papers and lint, are blown free from the coins and out of the machine. Liquids flow through the holes in bottom plate 800, flow through spout 750, and are collected in a separate receptacle. Magnetic strips 950 along the exit edge of the coin hopper and the entry edge of the waste management chute collect ferrous objects, such as tokens and slugs, removing them from the coins.

Figure 10:
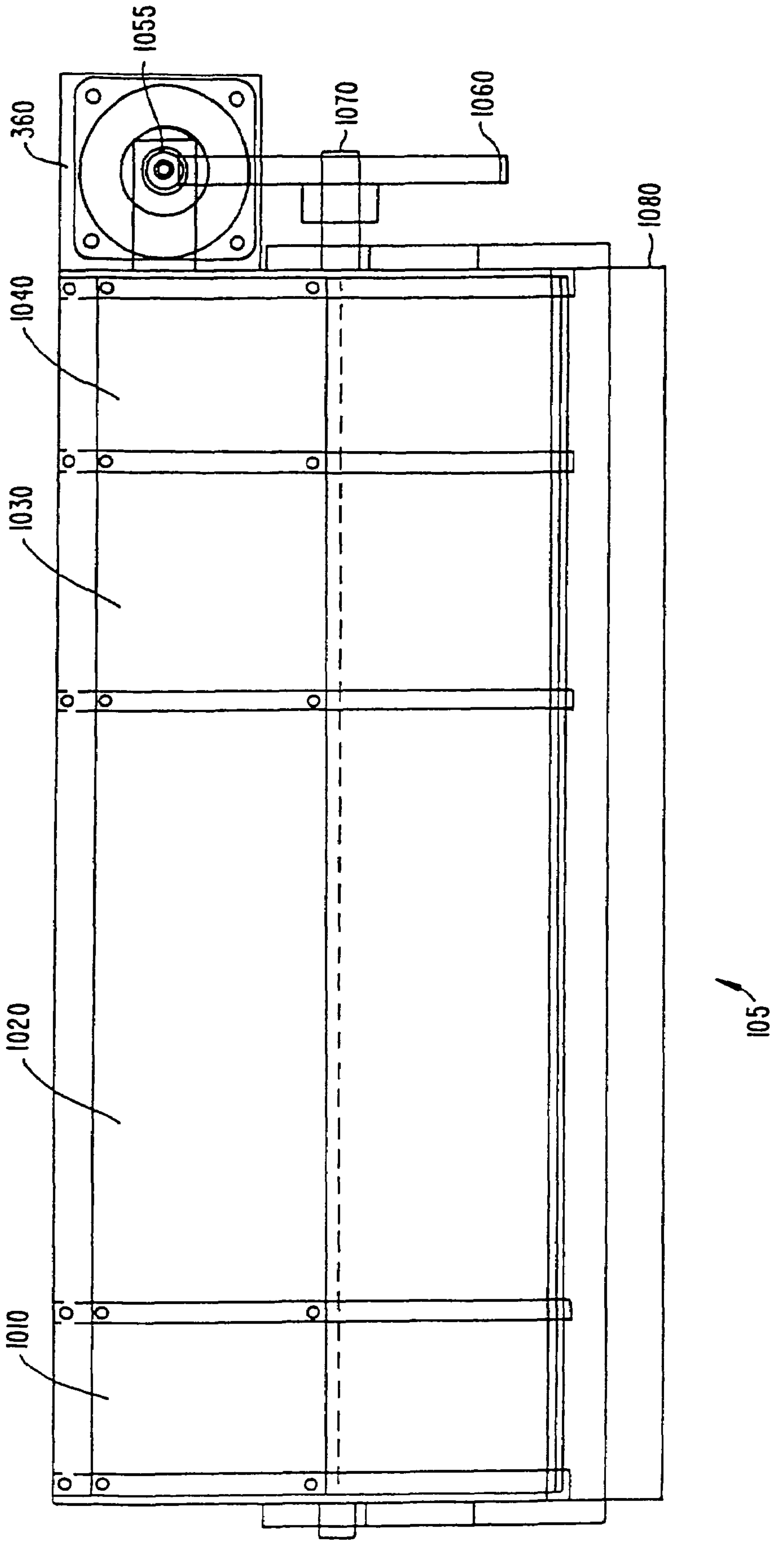
FIG. 10 is a front view of the escrow tray.

FIG. 10 is a front view of the escrow tray 105. Tray 105 is divided into four bins. Bin 1010 catches dimes from sorter 280; bin 1020 catches pennies; bin 1030 catches nickels; and bin 1040 catches quarters. Stepping motor 360 drives worm gears 1055 and 1060. When activated, stepping motor 360 moves the bottom surface 1080 of the tray along axis 1070. If the tray bottom 1080 is rotated outward, toward the user, the coins are dumped into a coin storage receptacle. If the tray bottom 1080 is rotated inward, away from the user, then the coins are dumped into a return receptacle.

Figure 11:
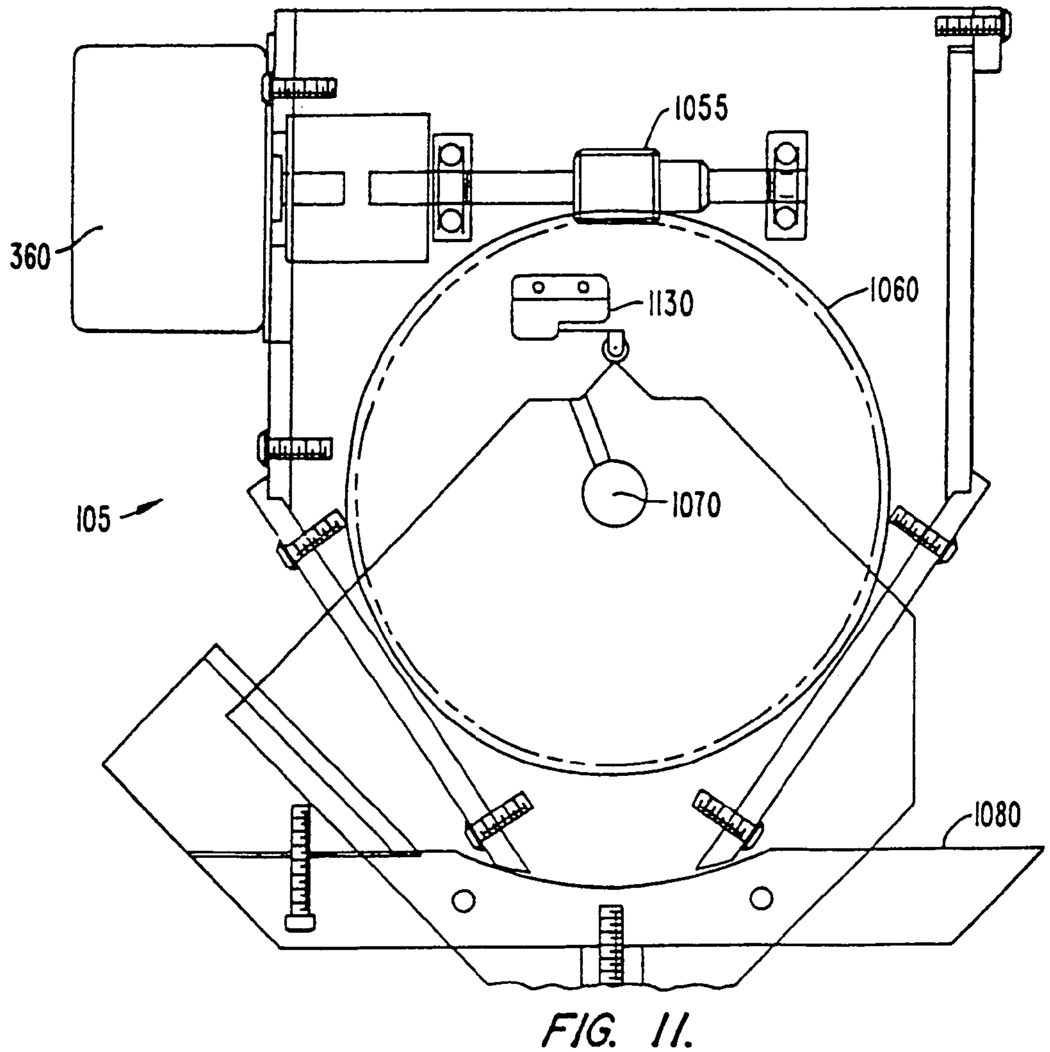
FIG. 11 is a side view of the escrow tray.

FIG. 11 is a side view of the escrow tray 105. Stepping motor 360 drives worm gears 1055 and 1060. When the stepping motor 360 is activated, worm gear 1060 is rotated along axis 1070. When gear 1060 is rotated clockwise, the bottom surface 1080 is rotated allowing the coins to be returned to the user in tray 170. When gear 1060 is rotated counter-clockwise, the bottom surface 1080 is rotated allowing the coins to be dumped into a coin depository. Microswitch 1130 prevents the stepping motor from moving the tray bottom 1080 past its pre-determined stops.

In light of the above description, a number of advantages to the present invention can be seen. In the typical installation, a user will receive a combination of both a voucher which can be spent by the shopper on store merchandise, and free coupons which provide incentive for shopping for items in the store by providing a discount on those items. Typically, the shopper will conduct the coin counting operation prior to doing shopping and thus the shopper will be armed with both an incentive for purchasing items in the store and the wherewithall (in the form a "spendable" voucher) to do so.

As will be understood by those familiar with the art, the present invention may be embodied in other specific forms without departing from the spirit or essential characteristics thereof. For example, the same printer could be used to print both the vouchers and periodic maintenance reports. Accordingly, disclosure of the preferred embodiments of the invention is intended to be illustrative, but not limiting, of the scope of the invention which is set forth in the following claims.

What is claimed is:

1. A method of exchanging coins, the method comprising:
- positioning a coin counting kiosk in a publicly accessible area of a supermarket;
- receiving, at the coin counting kiosk, a plurality of coins of multiple denominations;
- counting the plurality of coins to determine a total value of the coins;
- dispensing a voucher from the coin counting kiosk, wherein the voucher is redeemable at a point of sale in the supermarket for an amount equal to the total value of the coins less a fee; and
- communicating status information from the coin counting kiosk to a central computer located outside of the supermarket.

2. The method of claim 1 wherein dispensing a voucher from the coin counting kiosk includes dispensing a voucher that is redeemable for cash at the point of sale in the supermarket.

3. The method of claim 1 wherein dispensing a voucher from the coin counting kiosk includes dispensing a voucher that is redeemable for merchandize at the point of sale in the supermarket.

4. The method of claim 1 wherein positioning a coin counting kiosk in a publicly accessible area of a supermarket includes positioning a coin counting kiosk owned by a first party in a publicly accessible area of a supermarket owned by a second party, different from the first party.

5. The method of claim 1 wherein positioning a coin counting kiosk in a publicly accessible area of a supermarket includes positioning a coin counting kiosk operated by a first party in a publicly accessible area of a supermarket owned by a second party, different from the first party.

6. The method of claim 1 wherein positioning a coin counting kiosk in a publicly accessible area of a supermarket includes positioning a first coin counting kiosk in a publicly accessible area of a first supermarket, wherein the first coin counting kiosk is operated by a first party and the first supermarket is owned by a second party, different from the first party, and wherein the method further comprises:
- positioning a second coin counting kiosk operated by the first party in a publicly accessible area of a second supermarket owned by the second party; and
- communicating status information from the second coin counting kiosk to the central computer, wherein the central computer is located outside of the second supermarket.

7. The method of claim 1 wherein dispensing a voucher from the coin counting kiosk includes dispensing a voucher having a machine-readable version of transaction-identifying information.

8. The method of claim 1 wherein dispensing a voucher from the coin counting kiosk includes dispensing a voucher having a machine-readable version of the voucher amount.

9. The method of claim 1 wherein dispensing a voucher from the coin counting kiosk includes dispensing a voucher having transaction-identifying information in bar code.

10. The method of claim 1 wherein dispensing a voucher from the coin counting kiosk includes dispensing a voucher having the voucher amount in bar code.

11. The method of claim 1 wherein positioning a coin counting kiosk in a publicly accessible area of a supermarket includes positioning a coin counting kiosk in a grocery store.

12. The method of claim 1 wherein communicating status information from the coin counting kiosk to a central computer includes communicating information relating to a status of a coin receptacle positioned inside the coin counting kiosk.

13. The method of claim 1 wherein communicating status information from the coin counting kiosk to a central computer includes transmitting a signal to a remote computer when a coin receptacle positioned inside the coin counting kiosk is at least generally full of coins.

14. The method of claim 1 wherein communicating status information from the coin counting kiosk to a central computer includes transmitting a signal to a remote computer when a coin receptacle positioned inside the coin counting kiosk is at least generally full of coins, and wherein the signal causes a person to empty the coin receptacle.

15. The method of claim 1 wherein communicating status information from the coin counting kiosk to a central computer includes communicating status information when at least a portion of the coin counting kiosk malfunctions.

16. The method of claim 1, further comprising cleaning the plurality of coins after receiving the plurality of coins and before counting the plurality of coins.

17. The method of claim 1, further comprising separating debris from the plurality of coins after receiving the plurality of coins and before counting the plurality of coins.

18. The method of claim 1, further comprising paying a portion of the fee to the supermarket.

19. The method of claim 1, further comprising:

depositing the fee into a first account; and depositing the amount equal to the total value of the coins less the fee into a second account.

20. The method of claim 1 wherein the coin counting kiosk is operated by a first party and the supermarket is operated by a second party, different from the first party, and wherein the method further comprises:

depositing a first portion of the total value of the coins into a first account of the first party; and depositing a second portion of the total value of the coins into a second account of the second party.

21. The method of claim 1 wherein the coin counting kiosk is operated by a first party and the supermarket is operated by a second party, different from the first party, and wherein the method further comprises:

depositing the fee into a first account of the first party; and depositing the amount equal to the total value of the coins less the fee into a second account of the second party.

22. The method of claim 1 wherein the coin counting kiosk is operated by a first party and the supermarket is operated by a second party, different from the first party, and wherein the method further comprises:

depositing a first portion of the fee into a first account of the first party; and depositing a second portion of the fee into a second account of the second party.

23. The method of claim 1 wherein the coin counting kiosk is operated by a first party and the supermarket is operated by a second party, different from the first party, and wherein the method further comprises:

depositing a first portion of the fee into a first account of the first party; and depositing a second portion of the fee plus the amount equal to the total value of the coins less the fee into a second account of the second party.

24. A method of exchanging coins for cash, the method comprising:

positioning a first coin counting kiosk in a publicly accessible area of a first supermarket;

positioning a second coin counting kiosk in a publicly accessible area of a second supermarket;

communicatively coupling the first and second coin counting kiosks to a central computer located remotely from the first and second supermarkets;

receiving, at the first coin counting kiosk, a plurality of coins of multiple denominations;

counting the plurality of coins to determine a total value of the coins;

dispensing a voucher from the first coin counting kiosk, wherein the voucher is redeemable for an amount equal to or less than the total value of the coins; and communicating status information from the first coin counting kiosk to the central computer.

25. The method of claim 24 wherein the first and second coin counting kiosks are operated by a first company and the first and second supermarkets are operated by a second company, different from the first company.

26. The method of claim 24 wherein dispensing a voucher from the first coin counting kiosk includes dispensing a voucher that is redeemable in the first supermarket for a cash amount equal to the total value of the coins less a fee.

27. The method of claim 24 wherein communicatively coupling the first and second coin counting kiosks to a central computer includes communicatively coupling the first and second coin counting kiosks to a computer located outside of the first and second supermarkets.

28. The method of claim 24 wherein receiving a plurality of coins includes receiving a first plurality of coins, wherein counting the plurality of coins to determine a total value includes counting the first plurality of coins to determine a first total value, wherein dispensing a voucher includes dispensing a first voucher, wherein communicating status information includes communicating first status information, and wherein the method further comprises:

receiving, at the second coin counting kiosk, a second plurality of coins of multiple denominations;

counting the second plurality of coins to determine a second total value of the coins;

dispensing a second voucher from the second coin counting kiosk, wherein the second voucher is redeemable in the second supermarket for an amount equal to or less than the second total value of the coins; and communicating second status information from the second coin counting kiosk to the central computer.

29. The method of claim 24 wherein dispensing a voucher from the first coin counting kiosk includes dispensing a voucher having machine-readable information.

30. The method of claim 24 wherein communicating status information from the first coin counting kiosk to the central computer includes transmitting a signal to the central computer when a coin receptacle positioned inside the first coin counting kiosk is at least generally full of coins.

31. The method of claim 24 wherein communicating status information from the first coin counting kiosk to the central computer includes transmitting a signal when at least a portion of the first coin counting kiosk malfunctions.

32. The method of claim 24, further comprising automatically cleaning the plurality of coins at the first coin counting kiosk before counting the plurality of coins.

33. The method of claim 24 wherein the voucher is equal to the total value of the coins less a fee, and wherein the method further comprises paying a portion of the fee to the first supermarket.

34. A coin exchange system comprising:

a central computer; and a coin counting apparatus positioned in a publicly accessible area of a retail store, wherein the retail store is located remotely from the central computer, and wherein the coin counting apparatus includes:

a coin transfer tray;

a coin counting mechanism that receives coins from the coin transfer tray and counts the coins to determine a total;

a voucher dispenser that dispenses a voucher in exchange for the coins, wherein the voucher is redeemable at a cashier location in the retail store for an amount equal to or less than the total of the coins; and a communications facility operably coupled to the central computer, wherein the communications facility communicates status information from the coin counting apparatus to the central computer.

35. The coin exchange system of claim 34 wherein the voucher is redeemable at a cashier location in the retail store for an amount equal to the total of the coins less a fee.

36. The coin exchange system of claim 34 wherein the central computer is located in an office of an operator of the coin exchange system, and wherein the office is located remotely from the retail store.

37. The coin exchange system of claim 34 wherein the coin counting apparatus is owned by a coin exchange system operating company and the retail store is owned by a different company, and wherein the central computer is located in an office of the coin exchange system operating company.

38. The coin exchange system of claim 37 wherein the voucher is redeemable for cash at the cashier location in the retail store.

39. The coin exchange system of claim 37 wherein the voucher is redeemable for merchandize at the cashier location in the retail store.

40. The coin exchange system of claim 37 wherein the coin transfer tray has a sloped portion that directs the coins toward the coin counter.

41. The coin exchange system of claim 37 wherein the coin transfer tray has a stationary sloped portion that directs the coins toward the coin counter.

42. The coin exchange system of claim 37 wherein the communications facility includes a modem.

43. The coin exchange system of claim 37 wherein the coin counting apparatus further includes a central processing unit (CPU) communicatively coupled to a printer, wherein the CPU receives coin information from the coin counter and sends voucher printing instructions to the printer.

44. The coin exchange system of claim 37 wherein the coin counting apparatus is a first coin counting apparatus positioned in a publicly accessible area of a first retail store, and wherein the coin exchange system further includes:

a second coin counting apparatus positioned in publicly accessible area of a second retail store, wherein the second retail store is remote from the central computer, and wherein the second coin counting apparatus includes:

a coin receiving tray;

a coin counter that receives coins from the coin receiving tray and counts the coins to determine a total;

a voucher dispenser that dispenses a voucher in exchange for the coins, wherein the voucher is redeemable at a cashier location in the second retail store for an amount equal to or less than the total of the coins; and a communications facility that communicates status information from the second coin counting apparatus to the central computer.

45. The coin exchange system of claim 37, further comprising the retail store.

46. The coin exchange system of claim 37 wherein the retail store includes a supermarket, and wherein the coin exchange system further comprises the supermarket.

47. The coin exchange system of claim 37 wherein the voucher includes a machine-readable version of transaction-identifying information.

48. The coin exchange system of claim 37 wherein the voucher includes a machine-readable version of the voucher amount.

49. The coin exchange system of claim 37 wherein the voucher includes transaction-identifying information in bar code.

50. The coin exchange system of claim 37 wherein the voucher includes the voucher amount in bar code.

51. The coin exchange system of claim 37 wherein the communications facility transmits information to the central computer relating to a status of a coin receptacle positioned inside the coin counting apparatus.

52. The coin exchange system of claim 37 wherein the communications facility transmits a signal to the central computer when a coin receptacle positioned inside the coin counting apparatus is at least generally full of coins.

53. The coin exchange system of claim 37 wherein the communications facility transmits a signal to the central computer when a coin receptacle positioned inside the coin counting apparatus is at least generally full of coins, and wherein the signal causes a person to empty the coin receptacle.

54. The coin exchange system of claim 37 wherein the communications facility transmits a signal to the central computer when at least a portion of the coin counting apparatus malfunctions.

55. The coin exchange system of claim 37 wherein the coin counting apparatus further includes a voucher printer, and wherein the communications facility transmits a signal to the central computer when the voucher printer is out of printer paper.

56. The coin exchange system of claim 34 wherein the coin counting apparatus further includes a waste control system that cleans the coins before they are counted.

57. The coin exchange system of claim 34 wherein the coin counting apparatus further includes a waste control system, and wherein the waste control system includes a fan.

58. The coin exchange system of claim 34 wherein the coin counting apparatus further includes a waste control system, and wherein the waste control system includes at least one perforated surface over which the coins pass.

59. A method of exchanging coins, the method comprising:

receiving, at a coin counting kiosk operated by a first company, a plurality of coins of multiple denominations, wherein the coin counting kiosk is positioned in a publicly accessible area of a supermarket operated by a second company, and wherein the coin counting kiosk is communicatively coupled to a central computer located remotely from the supermarket;

counting the plurality of coins to determine a total value of the coins;

dispensing a voucher from the coin counting kiosk, wherein the voucher is redeemable in the supermarket for a cash amount equal to the total value of the coins less a fee; and communicating status information from the coin counting kiosk to the central computer.

60. The method of claim 59 wherein the fee is equal to a percentage of the total value of the coins.

61. The method of claim 59 wherein communicating status information includes communicating status information from the coin counting kiosk to a computer located outside of the supermarket.

62. A coin exchange system comprising:

a central computer; and a coin counting apparatus positioned in a publicly accessible area of a retail store, wherein the coin counting apparatus is owned by a coin exchange system operating company and the retail store is owned by a different company, wherein the central computer is located remotely from the retail store, and wherein the coin counting apparatus includes:

a coin transfer tray;

a coin counting mechanism that receives coins from the coin transfer tray and counts the coins to determine a total;

a voucher dispenser that dispenses a voucher in exchange for the coins, wherein the voucher is redeemable at a cashier location in the retail store for an amount equal to the total of the coins less a fee; and a communications facility operably coupled to the central computer, wherein the communications facility communicates status information from the coin counting apparatus to the central computer.

* * * * *

UNITED STATES PATENT AND TRADEMARK OFFICE
CERTIFICATE OF CORRECTION

PATENT NO. : 7,303,119 B2
APPLICATION NO. : 11/526196
DATED : December 4, 2007
INVENTOR(S) : Molbak It is certified that error appears in the above-identified patent and that said Letters Patent is hereby corrected as shown below:

Title Page;
On the face page, in field (60), under "Related U.S. Application Data", in column 1, line 14, delete "continuation" and insert -- continuation-in-part --, therefor.

On page 3, item (56); under "U.S. Patent Documents", in column 1, line 70, delete "Barrese et al." and insert -- Guheen et al. --, therefor.

On page 4, item (56); under "Other Publications", in column 1, line 8, delete "deposti" and insert -- deposit --, therefor.

On page 4, item (56); under "Other Publications", in column 2, line 16, delete "Complain" and insert -- Complaint --, therefor.

On page 4, item (56); under "Other Publications", in column 2, line 57, delete "Complain;" and insert -- Complaint; --, therefor.

On page 5, item (56); under "Other Publications", in column 2, line 9, delete "vaxelin," and insert -- vaxeln, --, therefor.

In column 1, line 3, below "title" insert -- Cross-Reference to Related Applications --.

In column 5, line 55, delete "invention.;" and insert -- invention; --, therefor.

In columns 9–10, lines 61–67, (Col. 9) and 1–3, (Col. 10), delete "FIG. 17, the receptacles for the bags are preferably tapered in shape 1702 so that, once the bags are filled with coins, they can be easily removed from receptacles without jamming. Casters 1704 facilitate withdrawal from the apparatus 1200 e.g., for removal of full coin bags, and transfer to a desired location. Although FIG. 16 shows trolleys 1610b configured to accommodate 5 and 3 bays, respectively, other configurations can be used. In one embodiment, each trolley is configured to accommodate two rows of bags, a front row and a rear row, with eight bags in each row." and insert the same on Col. 9, Line 60, after "As shown in" as a continuation of the same Paragraph.

In column 10, line 8, delete "a" and insert -- an --, therefor.

In column 12, line 62, delete "uninterruptable" and insert -- uninterruptible --, therefor.

In column 13, line 3, delete "uninterruptable" and insert -- uninterruptible --, therefor.

In column 14, line 32, delete "1428, 1430." and insert -- 1428, 1430. --, therefor.

UNITED STATES PATENT AND TRADEMARK OFFICE

CERTIFICATE OF CORRECTION

PATENT NO. : 7,303,119 B2
APPLICATION NO. : 11/526196
DATED : December 4, 2007
INVENTOR(S) : Molbak It is certified that error appears in the above-identified patent and that said Letters Patent is hereby corrected as shown below:

In column 15, lines 44–52, delete "Preferably, the apparatus also determines the amount that has been deposited in the various coin bags. This permits the apparatus to output a signal or notification when the bag capacity is nearly full, to enable armored car personnel or other personnel to retrieve the full bags and replace those with empty bags 1922 as described more fully below. As noted above, the apparatus, in one embodiment, will also automatically dispense one or more coupons 1924 at the conclusion of a counting transaction." and insert the same on Col. 15, Line 45, below "transaction 1920." as a new Paragraph.

In column 17, line 1, delete "accesses" and insert -- access --, therefor.

In column 20, lines 33–35, delete "Warning light 255 warns store personnel when either printer is low on paper, the sheet feeder is low on paper, or there has been a system malfunction." and insert the same on Col. 20, Line 32, after "HCF-1000." as a continuation of the same Paragraph.

In column 21, line 57, delete "chose" and insert -- choose --, therefor.

In column 22, line 48, delete "accidently" and insert -- accidentally --, therefor.

In column 27, line 14, in Claim 38, delete "claim 37" and insert -- claim 34 --, therefor.

In column 27, line 17, in Claim 39, delete "claim 37" and insert -- claim 34 --, therefor.

In column 27, line 20, in Claim 40, delete "claim 37" and insert -- claim 34 --, therefor.

In column 27, line 23, in Claim 41, delete "claim 37" and insert -- claim 34 --, therefor.

In column 27, line 26, in Claim 42, delete "claim 37" and insert -- claim 34 --, therefor.

In column 27, line 28, in Claim 43, delete "claim 37" and insert -- claim 34 --, therefor.

In column 27, line 34, in Claim 44, delete "claim 37" and insert -- claim 34 --, therefor.

In column 27, line 54, in Claim 45, delete "claim 37" and insert -- claim 34 --, therefor.

In column 27, line 56, in Claim 46, delete "claim 37" and insert -- claim 34 --, therefor.

In column 27, line 59, in Claim 47, delete "claim 37" and insert -- claim 34 --, therefor.

UNITED STATES PATENT AND TRADEMARK OFFICE

CERTIFICATE OF CORRECTION

PATENT NO. : 7,303,119 B2
APPLICATION NO. : 11/526196
DATED : December 4, 2007
INVENTOR(S) : Molbak It is certified that error appears in the above-identified patent and that said Letters Patent is hereby corrected as shown below:

In column 27, line 62, in Claim 48, delete "claim 37" and insert -- claim 34 --, therefor.

In column 27, line 65, in Claim 49, delete "claim 37" and insert -- claim 34 --, therefor.

In column 28, line 1, in Claim 50, delete "claim 37" and insert -- claim 34 --, therefor.

In column 28, line 3, in Claim 51, delete "claim 37" and insert -- claim 34 --, therefor.

In column 28, line 7, in Claim 52, delete "claim 37" and insert -- claim 34 --, therefor.

In column 28, line 11, in Claim 53, delete "claim 37" and insert -- claim 34 --, therefor.

In column 28, line 17, in Claim 54, delete "claim 37" and insert -- claim 34 --, therefor.

In column 28, line 22, in Claim 55, delete "claim 37" and insert -- claim 34 --, therefor.

Signed and Sealed this

Fifteenth Day of July, 2008

JON W. DUDAS
*Director of the United States Patent and Trademark Office*